US012725215B2

(12) United States Patent
De Villiers et al.

(10) Patent No.: US 12,725,215 B2
(45) Date of Patent: Sep. 1, 2026

(54) ARTIFICIAL INTELLIGENCE (AI)-BASED LEGAL ASSISTANT

(71) Applicant: Querious, Inc., Columbus, OH (US)

(72) Inventors: Eugene De Villiers, Schaumburg, IL (US); Hilary Bowman, Raleigh, NC (US); Anthony Dey, New Albany, OH (US)

(73) Assignee: Querious, Inc., Raleigh, NC (US)

( * ) Notice: Subject to any disclaimer, the term of this patent is extended or adjusted under 35 U.S.C. 154(b) by 0 days.

(21) Appl. No.: 19/072,415

(22) Filed: Mar. 6, 2025

(65) Prior Publication Data

US 2026/0087571 A1 Mar. 26, 2026

Related U.S. Application Data

(60) Provisional application No. 63/698,858, filed on Sep. 25, 2024.

(51) Int. Cl.
*G06Q 50/18* (2012.01)
*G06F 40/20* (2020.01)

(52) U.S. Cl.
CPC ............ *G06Q 50/18* (2013.01); *G06F 40/20* (2020.01)

(58) Field of Classification Search
None
See application file for complete search history.

(56) References Cited

U.S. PATENT DOCUMENTS 7,962,525 B2 6/2011 Kansal
10,075,676 B2 9/2018 Segal
10,262,654 B2 4/2019 Hakkani-Tur et al.
10,510,051 B2 12/2019 Nelson et al.
10,540,971 B2 1/2020 Kumar
10,586,539 B2 3/2020 Raanani et al.
10,860,797 B2 12/2020 Mahmoud
10,860,985 B2 12/2020 Nelson et al.
10,897,368 B2 1/2021 Mahmoud
10,911,718 B2 2/2021 Nassar
10,942,953 B2 3/2021 Mahmoud
(Continued)

OTHER PUBLICATIONS

International Search Report and Written Opinion dated Jan. 14, 2026 issued by the International Application Division, Korean Intellectual Property Office as International Searching Authority in connection with International Application No. PCT/US2025/045736 (8 pages).

*Primary Examiner* — Jessica Lemieux
(74) *Attorney, Agent, or Firm* — Neo IP

(57) ABSTRACT

A computer-based legal assistant tool is operable to receive information regarding a client, including legal documents, audio data from a meeting or a transcript therefrom, or other contextual information. The tool utilizes artificial intelligence to automatically generate at least one suggestion via a natural language output using a large language model. The at least one suggestion is based on training data used to train the artificial intelligence via at least one database to identify laws matching the information regarding the client. The at least one suggestion includes at least one question, relevant legal content, and/or a collaborator for an attorney that are relevant to the legal issues at hand. The tool is operable to automatically generate a summary of a meeting, the summary including follow-up items to provide to an attorney.

20 Claims, 6 Drawing Sheets

(56) References Cited

U.S. PATENT DOCUMENTS

| | | | | |
|---|---|---|---|---|
| 11,062,270 | B2 | 7/2021 | Hilleli et al. | |
| 11,095,468 | B1 | 8/2021 | Pandey et al. | |
| 11,115,226 | B2 | 9/2021 | Wiener et al. | |
| 11,176,949 | B2 | 11/2021 | Adlersberg et al. | |
| 11,282,006 | B2 | 3/2022 | Tolica et al. | |
| 11,483,273 | B2 | 10/2022 | Mahmoud et al. | |
| 11,736,310 | B2 | 8/2023 | Laird-Mcconnell et al. | |
| 11,983,674 | B2 | 5/2024 | Hilleli et al. | |
| 12,008,332 | B1 | 6/2024 | Gardner et al. | |
| 12,045,896 | B2 | 7/2024 | Forbes et al. | |
| 2013/0246290 | A1* | 9/2013 | Courson | G06F 40/205 705/311 |
| 2015/0221052 | A1 | 8/2015 | Messing | |
| 2016/0103569 | A1* | 4/2016 | Zatalovski | G06F 3/0482 715/738 |
| 2018/0077099 | A1* | 3/2018 | Silva | H04L 65/403 |
| 2018/0101281 | A1 | 4/2018 | Nelson et al. | |
| 2022/0012749 | A1 | 1/2022 | Apfelbaum et al. | |
| 2023/0106298 | A1 | 4/2023 | Mostafa et al. | |
| 2023/0163988 | A1 | 5/2023 | Wells et al. | |
| 2023/0282218 | A1 | 9/2023 | Moynihan et al. | |
| 2023/0403174 | A1 | 12/2023 | Mohanty et al. | |
| 2024/0185203 | A1 | 6/2024 | Sherman | |
| 2024/0202555 | A1 | 6/2024 | Mitra et al. | |
| 2024/0386379 | A1* | 11/2024 | Bower, III | G06Q 10/1093 |
| 2025/0005692 | A1 | 1/2025 | Johnson | |
| 2025/0053737 | A1 | 2/2025 | Hubley | |

* cited by examiner

Upcoming Meetings Completed Meetings Integrations Sign Out

Workplace Injury

Completed

Conference regarding Workplace Injury, Compensation Benefits, Jurisdiction 5 min (0.1 hr)

Summary

In the meeting, a client discusses their workplace injury with a lawyer, seeking legal advice and assistance. The client describes how a shelving unit collapsed at their warehouse job, resulting in injuries including a fractured arm. They have received some compensation benefits but feel pressured to return to work before they're ready. The lawyer explains the process of building a case, requests documentation, and discusses possible legal actions, including filing a lawsuit based on jurisdiction. The client agrees to provide the necessary documents for the lawyer to determine the best course of action.

Issues

Workers' Compensation Law: Determine whether the client is entitled to workers' compensation benefits under state law for injuries sustained from the shelving unit collapse at the workplace.

Questions

Were there any witnesses to the accident, and if so, have their statements been documented?

Was the shelving unit ever reported as having issues or needing maintenance before it collapsed?

FIG. 2A

ARTIFICIAL INTELLIGENCE (AI)-BASED LEGAL ASSISTANT

CROSS REFERENCES TO RELATED APPLICATIONS

This application claims the benefit of and priority to U.S. Provisional Patent Application No. 63/698,858, filed Sep. 25, 2024.

BACKGROUND OF THE INVENTION

1. Field of the Invention

The present invention relates to real-time generation of information during a meeting based in part on relevant context and conversation between meeting attendees, and more specifically to utilize artificial intelligence for automatic information retrieval, summarization, and generation.

2. Description of the Prior Art

It is generally known in the prior art to provide legal assistant software for use in note-taking as well as to utilize artificial intelligence with regard to automating specific legal tasks, such as deposition preparation and document review.

Prior art patent documents include the following:

US Patent Pub. No. 2025/0005692 for Legal resources application by inventor Sajida Allyce Johnson, filed Jul. 1, 2024, and published Jan. 2, 2025, discloses a method includes receiving a query from a user. The query includes at least one charge and jurisdiction associated with the charge, for example up to three charges in the jurisdiction. The method also includes retrieving, from a first database, laws and/or regulations of the jurisdiction. The method further includes retrieving, from a second database, the legal elements associated with the offenses charged. Additionally, the method includes retrieving, from a third database, defenses that can be raised for the offenses charged. The method includes retrieving, from a fourth database, one or more legal definitions associated with the offenses, defenses and elements. The method includes generating a plain language response based on the legal definitions, the offenses charged, the defenses, and one or more legal elements. Also, the method includes transmitting the plain language response to the user via the network.

US Patent Pub. No. 2025/0053737 for Specialized work product by inventor Jessica Hubley, filed Oct. 17, 2024, and published Feb. 13, 2025, discloses a method to produce an automated work product is described. The method includes receiving a request from a user and analyzing the request to determine which area of expertise applies to the request. The method also includes assigning a scope identifier to the area of expertise and generating a work product based on the user request and the scope identifier associated with the request.

US Patent Pub. No. 2024/0185203 for a Method and system for providing a professional service by inventor Kenneth L. Sherman, filed Feb. 15, 2024, and published Jun. 6, 2024, discloses a method comprising generating a first graphical user interface (GUI) for display on an electronic device. The first GUI comprises data indicative of at least one professional service available for selection. The method comprises receiving, from the electronic device, a request to initiate a professional service selected from the first GUI. The method further comprises generating a second GUI for display on the electronic device. The second GUI comprises a customized questionnaire for collecting information relevant to the professional service selected. The method further comprises receiving, from the electronic device, user responses to the customized questionnaire, and initiating an analysis of the user responses. A communication indicative of the analysis is forwarded to the electronic device.

US Patent Pub. No. 2023/0106298 for System and method for organizing, retrieving, and accessing information based on database structures in real time based on concurrent conversations by inventors Mostafa et al., filed Oct. 6, 2022, and published Apr. 6, 2023, discloses a system and method of organizing, retrieving, and accessing information comprising the steps: providing an electronic platform configured to allow one or more individuals to have a conversation; creating a contemporaneous record of said conversation on said electronic platform; continuously generating suggestions and information to one or more users based on said conversation; wherein said suggestions and information are determined in part by said electronic platform determining an appropriate minimum dictionary language library; displaying said suggestions and information to said one or more users.

US Patent Pub. No. 2023/0282218 for Near real-time in-meeting content item suggestions by inventors Moynihan et al., filed Jul. 20, 2022, and published Sep. 7, 2023, discloses improving existing technologies by causing presentation, to one or more user devices associated with one or more meeting attendees, of one or more indications of one or more content items during or before a meeting based at least in part on one or more natural language utterances associated with the meeting, a context of the meeting, and/or a context associated with one or more meeting attendees. In other words, particular embodiments automatically recommend relevant content items responsive to the real-time natural language utterances in the meeting, and/or other context.

US Patent Pub. No. 2015/0221052 for Automated legal issue spotting and reasoning method by inventor Messing, filed Feb. 4, 2014, and published Aug. 6, 2015, discloses a method and system for providing automated legal issue spotting and reasoning based upon a graphic user interface that queries users about operative facts defined by the application of legal principles, laws, and regulations to situations to which they were intended to apply, and linking the responses as variables through rule based programming to messages for display to the user about the resolution of the particular circumstances of the case.

US Patent Pub. No. 2023/0163988 for Computer-implemented system and method for providing an artificial intelligence powered digital meeting assistant by inventors Wells et al., filed Nov. 21, 2022, and published May 25, 2023, discloses a computer-implemented system and method for providing an artificial intelligence powered digital meeting assistant. A recording of conversational data from a meeting facilitated via an internet-based communication platform is obtained. The conversational data from the recording is transcribed and a summary of the meeting is generated based on the conversational data. A list of action items to be performed by one or more participants of the meeting is generated based on the conversational data. The summary and the list of action items are provided to the participants.

U.S. Pat. No. 11,095,468 for Meeting summary service by inventors Pandey et al., filed Feb. 13, 2020, and issued Aug. 17, 2021, discloses a meeting summary service to generate meeting notes. The meeting notes generated by the meeting summary service can include a variety of information such as participant information, meeting information (e.g., time, place, location, . . . ) meeting agenda information, identified action items, a transcript of the meeting, a recording of the meeting, meeting content presented and/or distributed during the meeting, and the like. The meeting summary service generates meeting notes utilizing a transcript created from a recording of the meeting. In some configurations, machine learning mechanisms may be utilized to identify action items and generating summary information for the meeting. Action items may be assigned to users and tracked to determine state of the action items (e.g., completed). The meeting summary service may also provide a user interface that allows a user, such as a meeting participant, to review the meeting notes.

U.S. Pat. No. 11,176,949 for Device, system, and method for assigning differential weight to meeting participants and for generating meeting summaries by inventors Adlersberg et al., filed Mar. 1, 2020, and issued Nov. 16, 2021, discloses devices, systems, and methods for assigning differential weight to participants in a meeting, and for automatically generating summaries of meetings. A transcript of the meeting is generated or obtained; and meeting data and meta-data is analyzed, optionally utilizing textual analysis and Natural Language Processing (NLP). Roles or titles are determined for each participant; and a differential weight is allocated to utterances of each participant based on his role or title. Optionally, the weight is modified based on the relation between the participant's role and the topic of an utterance, or by taking into account the level of activity or passiveness of each participant. Optionally, a high-ranking participant is assigned a prevailing weight, with regard to all topics or with regard to a subset of topics. The system generates automatically a summary of approved decisions, approved action items, rejected proposals, or other insights.

U.S. Pat. No. 12,045,896 for Automated time entries utilizing automated time capture by inventors Forbes et al., filed Mar. 23, 2022, and issued Jul. 23, 2024, discloses an apparatus and methods for generating automated time entries utilizing automated time capture. In an exemplary method, a duration of a communication session between a timekeeper operating a first communication device and a client operating a second communication device is determined in response to a termination of the communication session. The duration is determined by automated time capture without further input from the timekeeper. An automated time entry is generated upon termination of the communication session. The automated time entry identifies the timekeeper, the client, a date of the communication session, and the duration. A list of automated time entries is generated for review by the timekeeper. The list of automated time entries is provided to the timekeeper on one or more computing devices that includes the first communication device.

U.S. Pat. No. 11,115,226 for Debrief mode for capturing information relevant to meetings processed by a virtual meeting assistant by inventors Wiener et al., filed Jan. 30, 2018, and issued Sep. 7, 2021, discloses the interactive virtual meeting assistant implementing a meeting debrief post-processing operation. For a given meeting that the interactive virtual meeting assistant participated in, a meeting post-processing engine enables one or more participants of the meeting to associate a debrief with the meeting. The debrief may be an audio recording, a video recording, text, or any file. The meeting post-processing engine stores the debrief in data stores and provides access to the debrief via the meeting GUI associated with the meeting. The meeting post-processing engine also processes the debrief to generate tasks to be assigned to participants or other entities and/or schedule reminders to be provided to the participants or other entities. The debrief may be private, such that only the participant who provided the debrief may subsequently access the debrief.

U.S. Pat. No. 11,483,273 for Chat-based interaction with an in-meeting virtual assistant by inventors Mahmoud et al., filed Jul. 14, 2020, and issued Oct. 25, 2022, discloses chat-based interaction with an in-meeting virtual assistant. First, audio input associated with a meeting may be received. Next, an intent from the audio input may be detected. Text content associated with the audio input may then be generated in response to detecting the intent from the audio input. The text content may be displayed in a chat interface.

U.S. Pat. No. 10,942,953 for Generating summaries and insights from meeting recordings by inventor Mahmoud, filed Jun. 13, 2018, and issued Mar. 9, 2021, discloses a technique for generating a summary of a recording. The technique includes generating an index associated with the recording, wherein the index identifies a set of terms included in the recording and, for each term in the set of terms, a corresponding location of the term in the recording. The technique also includes determining categories of predefined terms to be identified in the index and identifying a first subset of the terms in the index that match a first portion of the predefined terms in the categories. The technique further includes outputting a summary of the recording comprising the locations of the first subset of terms in the recording and listings of the first subset of terms under one or more corresponding categories.

U.S. Pat. No. 10,911,718 for Enhancing meeting participation by an interactive virtual assistant by inventor Nassar, filed Nov. 2, 2018, and issued Feb. 2, 2021, discloses a technique for enhancing meeting participation by an interactive virtual assistant. The technique includes loading a resource for conducting the meeting over a teleconferencing system. The technique also includes configuring, based on the resource, virtual input/output (I/O) devices for integrating the interactive virtual assistant into the teleconferencing system during the meeting. In response to a command received over a first device in the virtual I/O devices, the technique further includes generating, by the interactive virtual assistant, output containing a response to the command over a second device in the virtual I/O devices.

U.S. Pat. No. 10,897,368 for Integrating an interactive virtual assistant into a meeting environment by inventor Mahmoud, filed Apr. 17, 2018, and issued Jan. 19, 2021, discloses a computer-implemented method for integrating an interactive virtual assistant in a meeting environment. The method comprises receiving an invitation to participate in the meeting environment, where the invitation includes text information, and applying at least a subset of a plurality of parsers to the text information in a given order to generate a text match for each of a plurality of fields of meeting information. The method further comprises, in response, when the text matches for at least a subset of the plurality of fields of meeting information meet one or more predetermined threshold criteria, causing the interactive virtual assistant to join the meeting environment based on the text matches for the at least the subset of the plurality of fields of meeting information.

U.S. Pat. No. 10,860,797 for Generating summaries and insights from meeting recordings by inventor Mahmoud, filed Jun. 13, 2018, and issued Dec. 8, 2020, discloses a technique for generating a summary of a recording. The technique includes generating an index associated with the recording, wherein the index identifies a set of terms included in the recording and, for each term in the set of terms, a corresponding location of the term in the recording. The technique also includes determining categories of predefined terms to be identified in the index and identifying a first subset of the terms in the index that match a first portion of the predefined terms in the categories. The technique further includes outputting a summary of the recording comprising the locations of the first subset of terms in the recording and listings of the first subset of terms under one or more corresponding categories.

US Patent Pub. No. 2023/0403174 for Intelligent virtual event assistant by inventors Mohanty et al., filed Jun. 9, 2022, and published Dec. 14, 2023, discloses a virtual event assistant, joining an online meeting and receiving a content of the online meeting in real-time, the content including an audio stream and a video stream of the online meeting. The method also includes, by the virtual event assistant, generating a summarized content of the online meeting based on a transcript of the online meeting, wherein generating the summarized content includes applying one or more artificial intelligence (AI)-based techniques to the transcript of the online meeting. The method further includes, by the virtual meeting assistant, determining contextual metadata of the online meeting based on analysis of the content of the online meeting. The method may also include providing the summarized content with the contextual metadata of the online meeting for playback by a user, for example.

U.S. Pat. No. 7,962,525 for Automated capture of information generated at meetings by inventor Kansal, filed Nov. 5, 2007, and issued Jun. 14, 2011, discloses meeting information collected in an automatic or automated manner utilizing user devices among other devices likely to be present at meetings. Devices can detect the occurrence of a meeting and initiate data capture. Subsequently, aggregated data can be processed to facilitate access and/or dissemination of the data. For instance, data can be contextualized and/or indexed. Further, data can be generated in or converted to forms more suitable for information distribution (e.g., summary, points of interest . . . ).

U.S. Pat. No. 11,983,674 for Automatically determining and presenting personalized action items from an event by inventors Hilleli et al., filed Jan. 7, 2020, and issued May 14, 2024, discloses computerized systems for automatically determining action items of an event, such as a meeting. The determined action items may be personalized to a particular user, such as a meeting attendee, and may include contextual information enabling the user to understand the action item. In particular, a personalized action item may be determined based in part from determining and utilizing particular factors in combination with an event dialog, such as an event speaker's language style; user role in an organization; historical patterns in communication; event purpose, name, or location; event participants, or other contextual information. Particular statements are evaluated to determine whether the statement likely is or is not an action item. Contextual information may be determined for action items, which then may be provided to the particular user during or following the event.

U.S. Pat. No. 11,736,310 for Conversational AI for intelligent meeting service by inventors Laird-McConnell et al., filed May 5, 2022, and issued Aug. 22, 2023, discloses a computing system for real-time analyzing meeting conversations using artificial intelligence (AI) configured to establish a meeting communication channel that facilitates a meeting among multiple client systems. Each of the multiple client systems corresponds to a meeting participant. In response to receiving communication from the multiple client systems, the computing system analyzes currently received communication via an AI engine while the meeting remains active. The currently received communication is communication received within a rolling time window ending at a current time. Based on the analysis, the computing system identifies an agenda item that has a highest correlation with the currently received communication and a sentiment of at least one participant. The computing system then determines a level of interest of the agenda item based on the sentiment of the participant and causes at least one client system to display a notification or an alert or make suggestions.

U.S. Pat. No. 11,282,006 for Action assignment tracking using natural language processing in electronic communication applications by inventors Tolica et al., filed Mar. 20, 2017, and issued Mar. 22, 2022, discloses systems and methods for meeting completion. In one implementation, a message generated in relation to a meeting is received. The message is processed to identify a first action item and a first user associated with the first action item. The first action item is assigned to the first user. Performance of the first action item by the first user is tracked. The performance of the first action item by the first user is presented within an action tracking interface.

U.S. Pat. No. 11,062,270 for Generating enriched action items by inventors Hilleli et al., filed Jan. 7, 2020, and issued Jul. 13, 2021, discloses computerized systems for automatically determining and providing enriched action items of an event, such as a meeting. Action items first may be determined and then enhanced or clarified in order to be more understandable by automatically modifying or supplementing the action item based on contextual information, such as related meeting discussion. Action items may be further enhanced through clarification by determining boundaries of their occurrence(s) so that extraneous content not related to the action items or not helpful for user understanding is deemphasized or excluded from presentation to the user. Some embodiments comprise an intelligent graphical user interface with functionality for receiving user feedback. The feedback can be employed to reconfigure the logic, such as machine learning models, utilized to determine the enriched action items to improve accuracy.

U.S. Pat. No. 10,262,654 for Detecting actionable items in a conversation among participants by inventors Hakkani-Tur et al., filed Sep. 24, 2015, and issued Apr. 16, 2019, discloses a computer-implemented technique for detecting actionable items in speech. In one manner of operation, the technique can include receiving utterance information that expresses at least one utterance made by one participant of a conversation to at least one other participant of the conversation. The technique can also include converting the utterance information into recognized speech information and using a machine-trained model to recognize at least one actionable item associated with the recognized speech information. The technique can also include performing at least one computer-implemented action associated the actionable item(s). The machine-trained model may correspond to a deep-structured convolutional neural network. The technique can produce the machine-trained model using a source environment corpus that is not optimally suited for a target environment in which the model is intended to be applied. The technique can provide adaptation techniques for adapting a source-environment model to better suit the target environment.

US Patent Pub. No. 2022/0012749 for Prospective client intake and assignment system by inventors Apfelbaum et al., filed Jun. 14, 2021, and published Jan. 13, 2022, discloses methods and systems for automatically interviewing and evaluating prospective clients for engagement by a law firm. Through a virtual agent interface a prospective client is engaged in conversation to elicit information useful in determining whether the prospective client is suitable for an engagement. Information obtained from the prospective client is evaluated to identify likely causes of action, which are scored and assessed against engagement criteria. If the scoring and assessment reveal that the prospective client's likely cause of action is suitable for engagement, an engagement process is initiated, otherwise, the interview continues in an attempt to identify other potential causes of action and/or additional facts for reassessing the initially identified potential cause of action. If one or more potential causes of action score sufficiently high enough to warrant engagement, an engagement process is initiated, otherwise a non-engagement procedure with the prospective client is performed.

US Patent Pub. No. 2024/0202555 for Method and system for providing virtual assistant in a meeting by inventors Mitra et al., filed Feb. 14, 2023, and published Jun. 20, 2024, discloses a method and system for providing a virtual assistant to participants in a meeting. The method includes receiving a set of data associated with the meeting. The set of data includes meeting details, participant details, discussion details, audio details, and video details. Next, the method includes analyzing, using a trained model, the set of data to provide the virtual assistant to the participants in the meeting. Thereafter, the method includes assisting the participants in the meeting based on the analysis of the set of data.

U.S. Pat. No. 10,860,985 for Post-meeting processing using artificial intelligence by inventors Nelson et al., filed Oct. 11, 2016, and issued Dec. 8, 2020, discloses artificial intelligence introduced into an electronic meeting context to perform various tasks before, during, and/or after electronic meetings. The tasks may include a wide variety of tasks, such as agenda creation, participant selection, real-time meeting management, meeting content supplementation, and post-meeting processing. The artificial intelligence may analyze a wide variety of data such as data pertaining to other electronic meetings, data pertaining to organizations and users, and other general information pertaining to any topic. Capability is also provided to create, manage, and enforce meeting rules templates that specify requirements and constraints for various aspects of electronic meetings.

U.S. Pat. No. 10,510,051 for Real-time (intra-meeting) processing using artificial intelligence by inventors Nelson et al., filed Oct. 11, 2016, and issued Dec. 17, 2019, discloses artificial intelligence introduced into an electronic meeting context to perform various tasks before, during, and/or after electronic meetings. The tasks may include a wide variety of tasks, such as agenda creation, participant selection, real-time meeting management, meeting content supplementation, and post-meeting processing. The artificial intelligence may analyze a wide variety of data such as data pertaining to other electronic meetings, data pertaining to organizations and users, and other general information pertaining to any topic. Capability is also provided to create, manage, and enforce meeting rules templates that specify requirements and constraints for various aspects of electronic meetings.

U.S. Pat. No. 10,540,971 for System and methods for in-meeting group assistance using a virtual assistant by inventor Kumar, filed Jan. 26, 2018, and issued Jan. 21, 2020, discloses, during a video conference meeting, a virtual assistant providing in-meeting assistance responsive to verbalized group intent. The virtual assistant may automatically perform actions, such as recording notes, creating calendar events, and obtaining information derived from previous meetings, in response to the detected group intent. The virtual assistant may also provide pre-meeting assistance.

U.S. Pat. No. 10,586,539 for In-call virtual assistant by inventor Raanani, filed Oct. 19, 2018, and issued Mar. 10, 2020, discloses an in-call virtual assistant system monitoring a real-time call, e.g., a call that is in progress, between multiple speakers, identifies a trigger and executes a specified task in response to the trigger. The virtual assistant system can be invoked by an explicit trigger or an implicit trigger. For example, an explicit trigger can be a voice command from one of the speakers in the call, such as "Ok Chorus, summarize the call" for summarizing the call. An implicit trigger can be an event that occurred in the call, or outside of the call but that is relevant to a speaker. For example, an event such as a speaker dropping off the call suddenly can be an implicit trigger that invokes the virtual assistant system to perform an associated task, such as notifying the remaining speakers on the call that one of the speakers dropped.

U.S. Pat. No. 10,075,676 for Intelligent virtual assistant system and method by inventor Segal, filed Jan. 10, 2018, and issued Sep. 11, 2018, discloses an intelligent virtual assistant for respectively customizable interactive audio/video content to each of a plurality of computing devices during a networked communication session. Input is received from at least one device, and is determined via information provided in or with the input, that the input is at least one of speech input, facial input, gesture input and textual input. The input is processed and machine-based learning occurs using at least some of the processed input. The intelligent virtual assistant is provided for the respectively customizable interactive audio/video content as a function of the machine-based learning process via at least one of the plurality of computing devices.

SUMMARY OF THE INVENTION

The present invention relates to software utilizing artificial intelligence (AI) for generating suggestions including potential issues, questions, and content relevant to conversations taking place within a meeting and/or summarizing and note-taking related to the conversations after a meeting.

It is an object of this invention to provide a tool for leveraging AI in a meeting. More specifically, the tool is operable to generate suggestions to identify potential legal issues, ask questions, and/or access relevant legal content within the context of conversation between meeting attendees occurring during the meeting. Further, after a meeting is complete, the tool is operable to generate a summary of the conversation between meeting attendees and make the suggestions available for further use and editing.

In one embodiment, the present invention is directed to an AI system for use in virtual meetings hosted by a third-party meeting platform and suggests, in real-time, potential legal issues, questions, and/or legal content relevant to a conversation conducted during a meeting. The AI system includes a large language model (LLM) and a graphical user interface (GUI), wherein the GUI is visible to at least one user account within the third-party meeting platform window and/or a standalone internet browser window that displays the potential legal issue, question, and/or legal content suggestions. The suggestions populate throughout the meeting based in part on context of the conversation.

In another embodiment, the present invention is directed to an AI system for use in virtual meetings hosted by a third-party meeting platform, wherein the AI system attends a virtual meeting, and based on the conversation between meeting attendees, generates structured meeting summaries after the virtual meeting, wherein the summaries include a plurality of sections that group content by topic. The AI system is operable to extract information from transcribed audio in real-time, process the transcribed audio via an LLM and send the summaries to a user account.

In one embodiment, the present invention is directed to an AI-based system for automatically suggesting potential legal issues, including at least one computer processor including a memory, at least one AI engine, and at least one user account, wherein the at least one user account hosts and/or attends at least one meeting, wherein the at least one computer processor is operable to receive at least one input from the at least one user account, wherein the at least one AI engine is operable to automatically determine at least one suggestion during and/or after the at least one meeting based on the at least one input, wherein the at least one suggestion includes at least one question, at least one legal issue automatically identified by the at least one AI engine, relevant legal content relating to the at least one legal issue, and/or at least one collaborator, and wherein the at least one AI engine is operable to display to the at least one user account the at least one suggestion based on the at least one input.

In another embodiment, the present invention is directed to an AI-based system for automatically suggesting potential legal issues, including at least one computer processor including a memory, at least one AI engine including a large language model, and at least one user account, wherein the at least one user account hosts and/or attends at least one meeting, wherein the at least one computer processor is operable to receive at least one input from the at least one user account, wherein the at least one AI engine is operable to utilize natural language processing to analyze the at least one input, wherein the at least one AI engine is operable to automatically determine at least one suggestion during and/or after the at least one meeting based on the at least one input, wherein the at least one suggestion includes at least one question, at least one legal issue automatically identified by the at least one AI engine, relevant legal content relating to the at least one legal issue, and/or at least one collaborator, and wherein the at least one suggestion is displayed to the at least one user account as a natural language output via the large language model.

In yet another embodiment, the present invention is directed to an AI-based system for automatically suggesting potential legal issues, including at least one computer processor including a memory, at least one AI engine, and at least one user account, wherein the at least one user account hosts and/or attends at least one meeting, wherein the at least one computer processor is operable to receive at least one input from the at least one user account, wherein the at least one AI engine is operable to automatically determine at least one suggestion during and/or after the at least one meeting based on the at least one input, wherein the at least one suggestion includes at least one question, at least one legal issue automatically identified by the at least one AI engine, relevant legal content relating to the at least one legal issue, and/or at least one collaborator, wherein the at least one AI engine is operable to display to the at least one user account the at least one suggestion based on the at least one input, and wherein the at least one AI engine is operable to generate a structured summary of the at least one meeting organized by topics discussed in the at least one meeting.

These and other aspects of the present invention will become apparent to those skilled in the art after a reading of the following description of the preferred embodiment when considered with the drawings, as they support the claimed invention.

BRIEF DESCRIPTION OF THE DRAWINGS

FIG. 2A illustrates a graphical user interface (GUI) for a user dashboard according to one embodiment of the present invention.

DETAILED DESCRIPTION

Figure 1:
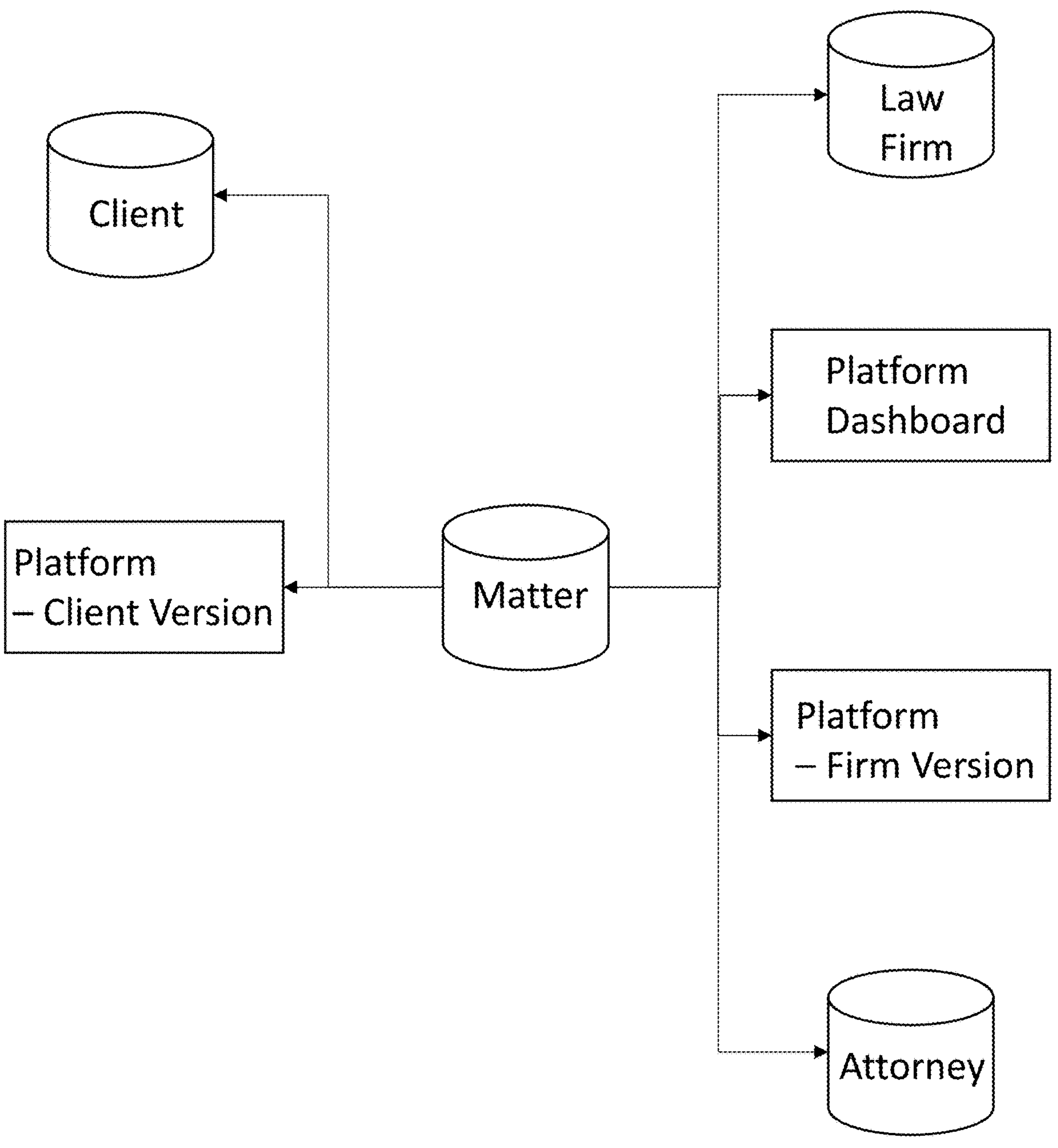
FIG. 1 illustrates a schematic diagram illustrating a relationship between a client-facing application and an attorney-user facing application of the platform according to one embodiment of the present invention.

The present invention is generally directed to artificial intelligence (AI) for use in meetings between at least two parties for generating in real-time suggestions including relevant issues, questions, and content, including summarization and note-taking regarding the same, based on applicable laws, meeting context, publicly available information, organization specific information, and/or relevant documents.

In one embodiment, the present invention is directed to an AI-based system for automatically suggesting potential legal issues, including at least one computer processor including a memory, at least one AI engine, and at least one user account, wherein the at least one user account hosts and/or attends at least one meeting, wherein the at least one computer processor is operable to receive at least one input from the at least one user account, wherein the at least one AI engine is operable to automatically determine at least one suggestion during and/or after the at least one meeting based on the at least one input, wherein the at least one suggestion includes at least one question, at least one legal issue automatically identified by the at least one AI engine, relevant legal content relating to the at least one legal issue, and/or at least one collaborator, and wherein the at least one AI engine is operable to display to the at least one user account the at least one suggestion based on the at least one input.

In another embodiment, the present invention is directed to an AI-based system for automatically suggesting potential legal issues, including at least one computer processor including a memory, at least one AI engine including a large language model, and at least one user account, wherein the at least one user account hosts and/or attends at least one meeting, wherein the at least one computer processor is operable to receive at least one input from the at least one user account, wherein the at least one AI engine is operable to utilize natural language processing to analyze the at least one input, wherein the at least one AI engine is operable to automatically determine at least one suggestion during and/or after the at least one meeting based on the at least one input, wherein the at least one suggestion includes at least one question, at least one legal issue automatically identified by the at least one AI engine, relevant legal content relating to the at least one legal issue, and/or at least one collaborator, and wherein the at least one suggestion is displayed to the at least one user account as a natural language output via the large language model.

In yet another embodiment, the present invention is directed to an AI-based system for automatically suggesting potential legal issues, including at least one computer processor including a memory, at least one AI engine, and at least one user account, wherein the at least one user account hosts and/or attends at least one meeting, wherein the at least one computer processor is operable to receive at least one input from the at least one user account, wherein the at least one AI engine is operable to automatically determine at least one suggestion during and/or after the at least one meeting based on the at least one input, wherein the at least one suggestion includes at least one question, at least one legal issue automatically identified by the at least one AI engine, relevant legal content relating to the at least one legal issue, and/or at least one collaborator, wherein the at least one AI engine is operable to display to the at least one user account the at least one suggestion based on the at least one input, and wherein the at least one AI engine is operable to generate a structured summary of the at least one meeting organized by topics discussed in the at least one meeting.

AI has raised several concerns with regard to its use in the legal profession. For example, with regard to generative AI, the use of AI to create briefs with hallucinated laws or regulations, or other inaccurate facts, and the increased risk to attorney-client confidentiality as a result of reliance on Internet-connected AI tools have been shown to be significant concerns. Additionally, the role of AI in increasing the efficiency with which tasks are able to be completed is often incongruous with the financial goals of legal professionals, given the billable hour systems used by law firms. Therefore, in addition to the quality issues reported with using artificial intelligence to generate legal documents (e.g., contracts), the use of such tools works directly against the interests of the attorneys tasked with generating them. However, these concerns do not mean that artificial intelligence-based tools are inherently against the interests of attorneys. Some tasks able to be performed by AI only supplement the tasks performed by attorneys, rather than replacing the work of the attorney, but what is not considered by the prior art is the ability of AI to help to identify additional opportunities for work and therefore not only help an attorney but work directly toward the financial and professional interests of the attorney. Therefore, what is needed is a tool that works to help an attorney and help to identify additional opportunities for work, while protecting attorney-client confidentiality.

Further, the prior art does not address improving conversation quality between a professional (i.e., attorney, doctor, accountant, consultant, etc.) and a potential client and/or current client. The prior art does not address real-time question generation to help professionals understand client needs during a meeting and display the questions to the professional to increase the quality of the conversation. While professionals often capture a large majority of necessary details about a particular matter, humans are necessarily imperfect and incapable of complete knowledge of every subject matter due to constantly evolving jurisprudence and the incomprehensible amount of legal doctrine. Thus, a professional may miss a small detail or forget to ask an important question. Therefore, there exists an unmet need for a tool that is able to generate suggestions for the professional to ensure complete coverage of a particular matter.

Referring now to the drawings in general, the illustrations are for the purpose of describing one or more preferred embodiments of the invention and are not intended to limit the invention thereto.

The present invention is directed toward a software tool useful in aiding, among others, legal professionals, in assessing a client's problems, indicating potentially applicable laws, generating potential follow-up questions, summarizing meetings, and performing other tasks. The present invention includes at least one AI engine. The at least one AI engine includes natural language processing capabilities such that the at least one AI engine is operable to analyze an input including text, audio transcriptions, live audio, and/or documents and extract relevant information from the input. Using the extracted information, the at least one AI engine is operable to determine a goal to be achieved for the at least one input. The at least one AI engine is able to be trained on a plurality of different data sources and data structures to learn how to respond to the input. As such, the at least one AI engine is operable to include LLM functionality such that the at least one AI engine is operable to process the input, determine goals for the input, determine an answer for the input, and output natural language results via the LLM functionality.

Further, the present invention is able to include a cloud platform accessible to legal professionals and/or clients via a web-based interface. The system is able to utilize one or more distributed databases accessible via Internet connection. Additionally or alternatively, the system is able to include one or more downloadable applications on a client device or an attorney device, able to perform one or more tasks locally isolated from or connected to a cloud-based server, processor, or database. Embodiments of the present invention are able to rely on local storage, without the need for a web-based database to store information related to client communication or client issues, or is able to utilize a web-based database as needed. Therefore, paradigms such as cloud-computing, edge-computing, or computing entirely performed on the client device or attorney device are compatible with the present invention and the present invention is not intended to be limiting with regard to where processing or storage of data is being performed.

Profile Generation

The tool is operable to generate user profiles for attorneys, law firms as a whole, paralegals, clients, or other individuals. In one embodiment, the user profiles are generated based on received user input data from a client device, an attorney device, or another user device. The received user input data is able to include a combination of a name, an email address, a phone number, one or more bar numbers, one or more qualified jurisdictions (e.g., which states an attorney is licensed to practice in, which countries an attorney is able to operate in, which federal courts an attorney is barred in, etc.), one or more certifications of the attorney (e.g., patent bar certified, etc.), a law firm or company that a user works for, a physical address, one or more interests, one or more degrees (e.g., juris doctorate (JD), master of laws (LLM), doctor of philosophy (Ph. D), bachelor's degree (BA/BS/BSE), etc.), and/or other information regarding an individual or entity creating the profile. For entities (i.e., law firms or companies) creating profiles, profile information is able to include a name, a number of employees, a number of particular types of employees (e.g., attorneys, paralegals, etc.), a founding year, financial information, a state of incorporation, and/or other information.

In one embodiment, the tool is operable to receive information from one or more certifying bodies (e.g., state bar organizations) and/or is operable to receive uploaded documents verifying certifications and/or qualified jurisdictions of a profile in order to ensure that the designated professional qualifications for individual profiles are accurate. In one embodiment, the tool includes one or more whitelists to which profiles are operable to be added based on qualified jurisdictions or other certifications.

In one embodiment, the tool is operable to tailor itself for a particular attorney and/or organization. In doing so, the tool is operable to include in the knowledge base of the tool information about the attorney, law firm, other attorneys in the law firm, etc. In this embodiment, the tool is operable to tailor suggestions to the attorney based on the experiences of the attorney, suggest collaborations between attorneys within the firm with helpful knowledge of a particular matter, and/or suggest special counsel members with proper bar affiliations. In one embodiment, the tool is operable to aggregate structured summaries for all meetings within an organization (i.e., law firm), recommend certain legal issues that need to be addressed, and/or recommend an attorney within the organization most suitable for a particular legal issue. In this embodiment, the tool utilizes information about a law firm to understand different practice areas for different attorneys and is able to assign/recommend work accordingly. As such, the tool is able to generate more work for the firm by identifying legal issues that humans missed and increases the quality of the work performed because the tool recommends the most qualified attorney to work on the matter based on the knowledge base, context extracted from conversations during meetings, and/or aggregated structured summaries of all prior meetings.

One of ordinary skill in the art will understand that the term "client" is able to refer to any individual or corporate entity seeking out legal guidance from an attorney. This includes attorneys as clients, especially as those attorneys represent in-house counsel acting for a company's interests in communication with outside counsel. However, it is also able to include direct engagement with individual clients as well. The term "client device" as used in therefore refers to any device a client uses to access the tool of the present invention (e.g., a smartphone, a tablet, a computer, etc.). Similarly, the term "attorney device" refers to any device an attorney uses to access the tool of the present invention (e.g., a smartphone, a tablet, a computer, etc.).

Client Data Acquisition

In order for the system to make decisions (e.g., matching with an attorney) or make suggestions regarding a client's matters, the tool must receive data of some kind regarding the client and/or the client's matter at hand. However, the forms in which this data is able to be ingested are various. In one embodiment, information from the client is received via creation of a client profile based on input on a client device. This information is able to include a location of a client, a name, an age, a gender, a race, an income level, a religion, and/or other information of the client which possibly informs applicable laws involved in a particular manner. In one embodiment, the client profile page includes a free form text box operable to receive text input from the client device describing one or more problems. The tool is then able to utilize a natural language processing (NLP) module to analyze the text to determine the context of a client's situation. Alternatively, separate individual matters pages are operable to receive long form text input or short form text input followed by a series of automated generative chatbot responses in order to receive context regarding a specific matter. In one embodiment, text information is received by the tool via a text conversation facilitated by the tool between at least one attorney or other professional and the client, such that attorney-directed questions, rather than automated generative ones, are used to expand the client's response.

Additionally or alternatively, information regarding a client's matters is also able to be received in the form of audio data. For example, the input data used for the decision-making of the tool is able to be received via integration with one or more video chat interferences, including either a native video chat interface of the tool or application programming interface (API)-based integration with one or more third party video chat interfaces. Audio data generated from one or more video chat instances is able to be processed by the tool to generate a transcript including information regarding a client's situation. In one embodiment, the tool also includes a voice memo recording module operable to receive an audio recording from a client device describing a problem in detail and utilizing a transcript generated from this audio recording as input data. In one embodiment, the tool is operable to determine which meeting attendee is speaking based on context from the meeting.

In one embodiment, the input data used for the decision-making of the tool is able to be received via integration with one or more scheduling interfaces, including either a native scheduling interface of the tool or API-based integration with one or more third party scheduling interfaces. For example, a scheduling interface includes a meeting title, prior meeting history, email communications, attached documents, meeting attendees, etc. The input data is able to include data received from scheduling interfaces and combine that data with law firm specific document management systems like billing software to inform meeting prompts, billable time, and create context for a meeting between an attorney and a client before the meeting occurs. Automatically creating context for the meeting, without manual human input, before the meeting starts enables the tool to enhance meeting quality and suggestions generated by the tool. For example, the tool is operable to create context for a meeting based on a knowledge base of the tool, documents exchanged between an attorney and a client, email exchanges, data extracted from calendaring interfaces, prior meeting conversations, structured summaries, and/or any other data extracted from an organization that does not require direct human input. Advantageously, the tool does not require a user to upload information about a client to generate context because the tool is operable to automatically generate context prior to a meeting.

In one embodiment, the tool is able to receive one or more documents and/or one or more text descriptions of relevance for each document, where the documents are pertinent to an issue at hand for a user. For example, the tool is able to receive uploaded versions of specific contracts and/or videos or images of a situation relating to a client's issues (e.g., crash site photos, photos or videos showing a device not functioning properly, etc.). The platform is operable to utilize natural language processing (NLP) for text and/or artificial intelligence-based image or video analysis, as applicable, to parse the contents of the uploaded documents to determine contextual information regarding a client's situation.

One hesitation with utilizing software tools to take in client data, especially documents and other evidentiary items from clients is that of confidentiality of the documents. The present invention is able to solve this issue in at least two different ways. First, one embodiment of the present invention is directed to the tool as a localized software application or at least utilizing localized storage based in at least one computer of the law firm prompting for information. In this way, the system mitigates the risks of having the data be centrally stored in a cloud server, where a potential breach could otherwise lead to exposure of sensitive details. Second, in one embodiment, at least one database used to store user information for processing is able to automatically purge information after a preset time period (e.g., 2 days, 2 weeks, 30 days, 6 months, 1 year, etc.) limiting the amount of time for potential exposure. This time period is able to be set as a standard across all client data utilized by the tool, or have preset time periods based on received inputs from the client device and/or attorney device to alter a default purge time limit. In this way, the data is able to be stored on a database associated with the tool only as long as the data is relevant for resolving an issue at hand, or only as long as needed for an attorney to review the information and prepare necessary documentation or notes regarding it. A mixed system of the above approaches is able to be used such that, after receiving client information, the client information is automatically added to one or more remote databases (e.g., cloud databases). In this embodiment, while information is purged from the one or more remote databases after a time limit, if the information is then stored locally onto a database associated with the attorney or law firm, this information is able to remain on the local servers, where risk of the information being compromised is much lower.

In one embodiment, the platform is operable to summarize all data analyzed and processed by the platform. In one embodiment, the platform is operable to summarize data related to a particular client, legal issue, attorney, law firm, and/or any other data. In one embodiment, the summarized data is operable to be in a form most relevant to an attorney viewing the summarized data. For example, during a meeting, a client may express contempt for a counterparty based on an outcome from a set of facts set forth by a counterparty. Instead of summarizing the expressions of the client as, “client dislikes the counterparty,” the platform is operable to summarize the expressions of the client relevant to legal inquires such as, “client strongly disagreed with facts of the case set forth by the counterparty.” Importantly, summarizing data in a form most relevant to the attorney enables the attorney to rely on the platform for automatically generated summaries, which enables the attorney to focus on conversations with the client instead of note-taking and trying to translate what the client is saying into relevant legal observations.

Issue-Spotting with an LLM

One important feature of the tool of the present invention is the ability to automatically identify relevant laws, regulations, codes, etc. relating to an issue for a client by leveraging an LLM. In one embodiment, the tool includes at least one AI engine trained for issue spotting using a plurality of different data and data structures. In one embodiment, the at least one AI engine is trained to perform any number of tasks particular to an industry. The at least one AI engine further includes an LLM and natural language processing such that the at least one AI engine is able to process an input and determine actions/information necessary to respond to the input. The at least one AI engine is operable to use the different data and data structures the at least one AI engine was trained on to respond to the query by outputting a natural language result. This ability is useful for several reasons relating to different contexts of receiving client information. In one embodiment, where a client is not initially matched with an attorney, identifying relevant laws is useful for determining an attorney or firm with which to match the client (i.e., someone who is experienced with dealing with the relevant law, regulation, code, etc.). Furthermore, identifying potentially relevant laws is important for providing initial expectations and information to a client, which possibly results in the client determining whether to proceed. In one embodiment, the tool is operable to receive instructions as to broad jurisdictional boundaries (i.e., country, geographical union, etc.). For example, the tool is operable to receive instructions to only search for laws within the United States. Then, in one embodiment, the tool is operable to further narrow the jurisdiction to a particular state and/or relevant jurisdiction for a particular legal issue automatically. In another embodiment, the tool receives instructions as to what jurisdiction to search. In another embodiment, if the tool does not determine a jurisdiction, the tool is operable to suggest at least one question to an attorney to find the relevant jurisdiction. Once a client and an attorney are connected, identification of relevant laws to a client's legal issue is still important, as it allows the tool to highlight potential legal issues that an attorney is likely to overlook, thereby allowing a more complete addressing of the issues of the client and thereby helping to produce additional work for the attorney, provide additional context for a particular legal issue, summarize relevant legal content, retrieve relevant legal content, inform the attorney about a legal issue, and/or recommend an additional attorney to collaborate with.

A first step for identifying relevant laws is verifying a controlling jurisdiction for a particular matter at hand. This step is important, as different states (or even countries) have different laws and application of these different laws potentially results in different questions being relevant and potentially opposite outcomes based on the facts of the case. However, the controlling jurisdiction is not always simple to determine. In one embodiment, the tool is able to determine a controlling jurisdiction based on direct input from a client device or attorney device, wherein the input directly states the controlling jurisdiction. In this embodiment, the tool does not need to determine the jurisdiction, but is rather provided with this information, thereby simplifying the analysis. In one embodiment, a jurisdiction is determined based on NLP-based analysis of one or more text documents uploaded by at least one client device and/or at least one attorney device. This is particularly useful in the case of contracts, which often include a governing law provision that allows for relatively easy determination of which jurisdiction is most relevant.

In other instances, the tool is able to determine a location of a client based on information in the client profile and/or based on geolocation data received from a geolocation sensor on the client device. Based on this information and/or based on received input indicating a location of another party involved in a matter or issue, the tool is able to estimate a likely controlling jurisdiction. In some instances, there are multiple possible jurisdictions, either meaning multiple states across which an issue has ties or where a case is possibly able to be brought in both state and federal courts (e.g., diversity jurisdiction cases). In these instances, the tool is able to identify relevant laws from each potentially applicable jurisdiction. Upon proposing legal issues from different jurisdictions, the tool is able to receive an input to limit analysis to one or more particular jurisdictions by a client device or attorney device and focus on laws from the chosen jurisdiction for that issue going forward.

In one embodiment, the tool is able to determine a jurisdiction based on NLP-analysis of audio data during and/or after a meeting between an attorney and a potential client. In this embodiment, the platform is operable to analyze audio data to determine what jurisdiction is most relevant to the legal question of the client. For example, an attorney asks a client where the business of the client is incorporated, where an event took place, where the client lives, etc. The tool is operable to determine a client response is indicative of the jurisdiction. As such, the tool is operable to determine a relevant jurisdiction based on the conversation between the attorney and the potential client and use that data to inform future responses.

The sources from which laws are able to be sourced also vary. In one embodiment, the tool includes an integrated web crawler operable to crawl a general search engine (e.g., GOOGLE, BING, etc.) for particular law authorities, which are able to be compiled. In one embodiment, the tool includes an integrated web crawler operable to crawl publicly available legal documents and/or sources such as published laws, Security and Exchange Commission (SEC) filings, public regulations, court cases, and/or any other publicly available legally relevant sources. In one embodiment, the integrated web crawler is operable to crawl a particularized law resource database (e.g., LEXIS NEXIS, WESTLAW, BLOOMBERG LAW, etc.) and/or at least one government website including law code publications or judicial decisions to compile law authorities. In another embodiment, the tool is operable to suggest relevant legal issues from a conversation between meeting attendees using NLP and an LLM, and then, based on the suggested legal issues, retrieve, using NLP and the LLM, only relevant, factual legal content which the tool is operable to display to a user. In this embodiment, the LLM is able to use retrieval augmented generation (RAG) to retrieve only relevant content. The LLM is operable to search the internet for information related to the processed conversation, identified issues, relevant content, and summarize retrieved information. In another embodiment, the tool includes or is connected to a legal resource database including statutes, regulations, and/or judicial dispositions for various jurisdictions. Compilation by the web crawler is able to update this legal resource database. As client issue information is received and NLP is used to analyze that information, the tool is then able to compare the analyzed information to either legal principles in the legal resource database for one or more jurisdictions determined to be relevant or to factual background for previous cases in the jurisdiction, subsequently determining under what judicial or statutory principles that case was decided or what facts were particularly relevant to the previous cases. In one embodiment, the platform is operable to utilize legally relevant information from verified and citable sources.

This system allows the present invention to utilize artificial intelligence, and particularly machine learning, techniques to automatically determine relevant laws, facts of consequence, and/or other contextually relevant information and utilize this information in order to perform the tasks mentioned below, including generating specific suggestions that help elucidate relevant facts of a case, as well as likely to elicit responses that help to identify potential additional legal issues for which the attorney is able to assist the client.

Text Parsing and Transcript Generation

An important part of the present invention is necessarily text parsing, transcript generation, semantic extraction, and other NLP-related tasks with regard to the input information regarding the client matters. These tasks allow the tool to analyze, interpret, make decisions, and generate suggestions based on the input data. Methods of semantic extraction able to be used by the present invention include, but are not limited to, those described in U.S. Pat. Nos. 11,113,234, 11,875,585, and 10,810,215, each of which is incorporated herein by reference in its entirety. Methods of transcription generation able to be used by the present invention include any methods known in the art including, but are not limited to, those described in U.S. Pat. Nos. 10,019,989, 11,876,632, and 11,488,604, each of which is incorporated herein by reference in its entirety.

In one embodiment, in order to handle communications in different languages, the tool includes a translation module operable to automatically translate what is being said by any party. In one embodiment, this translation is operable to be used for interpretation in live video chat conversations and/or receive and process speech directly, while in another embodiment, it is used to generate translated recordings of calls and/or generate translated transcripts of the calls.

Based on semantic analysis of the generated transcripts of the calls, the tool is operable to generate a summary document for the calls, indicating what items were talked about and highlighting follow-up items from previous calls between the parties or between the attorney and other clients. By training the tool, it is able to more accurately segment areas of important information to summarize in a call and areas indicative of a proposed follow-up item, or rejected follow-up items, which will not be included. In one embodiment, the tool is operable to recognize questions asked during the call which were not answered for whatever reason (e.g., time, distraction, etc.), suggested questions that were not asked, and/or questions or bullet points on an agenda received by the tool which were not addressed. In one embodiment, the tool is trained using public data and is available for public use. In another embodiment, the tool is trained based on information from a specific organization (i.e., a law firm) and only accessible to employees in that organization. The summarization by the tool is operable to include these items as a reminder for where an attorney is able to follow up or obtain additional information via subsequent meetings or via email.

In one embodiment, the tool is operable to receive preference selections regarding what items to include in a summarization of the call, including to include or exclude follow-up items, include or exclude unanswered questions, include or exclude content based on tool-generated suggestions, and/or other preferences. In one embodiment, the tool is operable to receive preference selections regarding a method in which the summarization is communicated to the attorney, including but not limited to via email, via text message, via display in a graphical user interface (GUI) associated with the tool, and/or by other means. One of ordinary skill in the art will understand that while the preferred embodiment focuses on generation and transmission of summaries for the attorney that summaries are also able to be generated for and transmitted to the client device as well.

In one embodiment, summarization differs depending on a type of meeting being summarized. For example, client intake meetings, business pitches, negotiations, depositions, and other types of meetings are able to have different parameters that are included in a summarization, based on aspects more likely to be relevant to those types of meetings. By way of example and not limitation, deposition summarizations are able to emphasize points at which either attorney objected, the types of objections being made, or provide action items such as what information should be sought through discovery next. Alternatively, in a negotiation meeting, the summarization is able to include what terms each party accepted or rejected and potentially a list of potential terms to discuss with a client.

Suggestions Generated from Various Modes of Communication

An important differentiating feature of the present invention is the ability of the tool to make suggestions to users in real-time based on analyzed conversations. Preferably, the tool is operable to provide suggestions in real time such that an attorney is able to mention potential legal issues, ask certain questions, and raise relevant legal content in the course of the same conversation, but the present invention also contemplates embodiments wherein suggestions are transmitted after a call or conversation has concluded such that the suggestions are leveraged in a subsequent follow-up conversation.

The tool is able to integrate as a plug-in with various modes of communication, including different video chat platforms or text chat interfaces, allowing the tool to act as third-party in the conversation and generate suggestions to the user. For example, in the associated text interface of a video call, the tool is operable to automatically generate one or more suggestions to the user about relevant legal issues, questions, and content. Alternatively, if text messages or an integrated chat interface of the tool are used, the tool is similarly able to generate suggestions to the user about relevant legal issues, questions, and content within the context of the conversation taking place in text messages. In one embodiment, these generated messages by the tool are only visible to the attorney-user or only visible to the client, while, in another embodiment, the messages are shared by the attorney-user with all parties in the conversation.

Display of Suggestions in Various Forms

FIG. 1 illustrates a schematic diagram illustrating a relationship between a client-facing application and an attorney-user facing application of the platform according to one embodiment of the present invention. As shown in FIG. 1, the tool receives description of a matter from a client version of the tool via a client device. Based on the description and/or transcripts, summaries or documents specific to the matter, an analyzed version of the matter is able to be produced, at which point the platform is able to match the client with one or attorneys or firms via a dashboard of a firm or attorney version of the tool.

The platform is operable to utilize a plurality of learning techniques including, but not limited to, machine learning (ML), artificial intelligence (AI), deep learning (DL), neural networks (NNs), artificial neural networks (ANNs), support vector machines (SVMs), Markov decision process (MDP), and/or natural language processing (NLP). The platform is operable to use any of the aforementioned learning techniques alone or in combination.

Further, the platform is operable to utilize predictive analytics techniques including, but not limited to, machine learning (ML), artificial intelligence (AI), neural networks (NNs) (e.g., long short term memory (LSTM) neural networks), deep learning, historical data, and/or data mining to make future predictions and/or models. The platform is preferably operable to recommend and/or perform actions based on historical data, external data sources, ML, AI, NNs, and/or other learning techniques. The platform is operable to utilize predictive modeling and/or optimization algorithms including, but not limited to, heuristic algorithms, particle swarm optimization, genetic algorithms, technical analysis descriptors, combinatorial algorithms, quantum optimization algorithms, iterative methods, deep learning techniques, and/or feature selection techniques.

An important differentiating feature of the present invention is the ability of the tool to make suggestions in real-time available to the user in a GUI that is easy to read during a virtual meeting and after such meeting.

FIG. 2A illustrates a graphical user interface (GUI) for a user dashboard according to one embodiment of the present invention. In one embodiment, the dashboard exists in a standalone browser. In one embodiment, the user dashboard includes a plurality of interactive features. The interactive features include the platform receiving a selection for upcoming meetings, completed meetings, and/or integrations. FIG. 2A illustrates a header for a type of legal issue discussed in a completed meeting, for example, workplace injury. After the meeting, the tool generates a structured summary of the meeting. During and/or after the meeting, the tool generates at least one suggestion, the at least one suggestion including a legal issue, at least one question relating to the at least one legal issue, and/or content relating to the legal issue displayed via the GUI depicted in FIG. 2A. Further, the dashboard includes a length of time for the meeting, for example, 5 minutes or 0.1 hours. In this embodiment, the tool generates a billing summary for the time spent on the meeting.

Figure 2B:
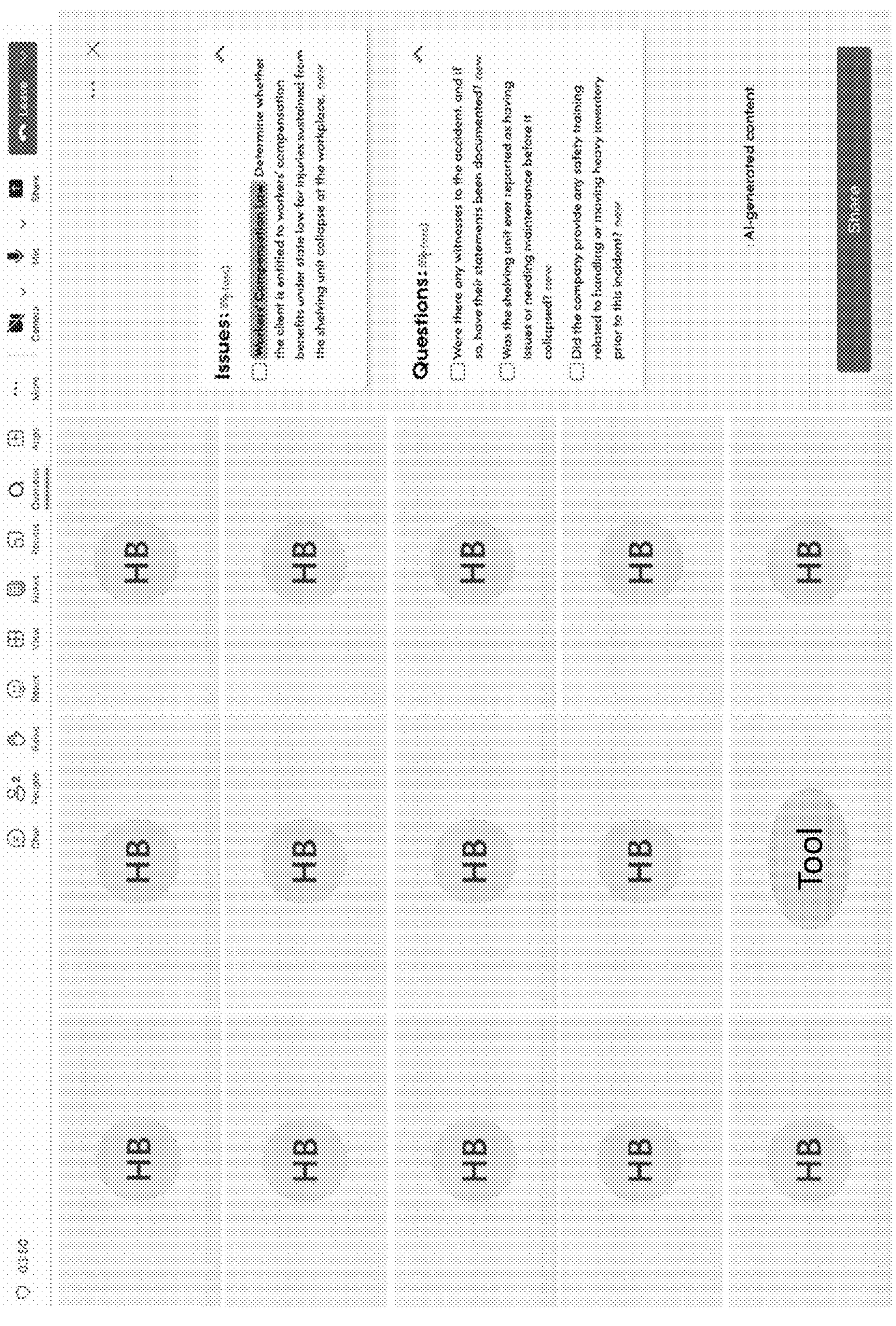
FIG. 2B illustrates a graphical user interface (GUI) during a meeting according to one embodiment of the present invention.
Figure 2C:
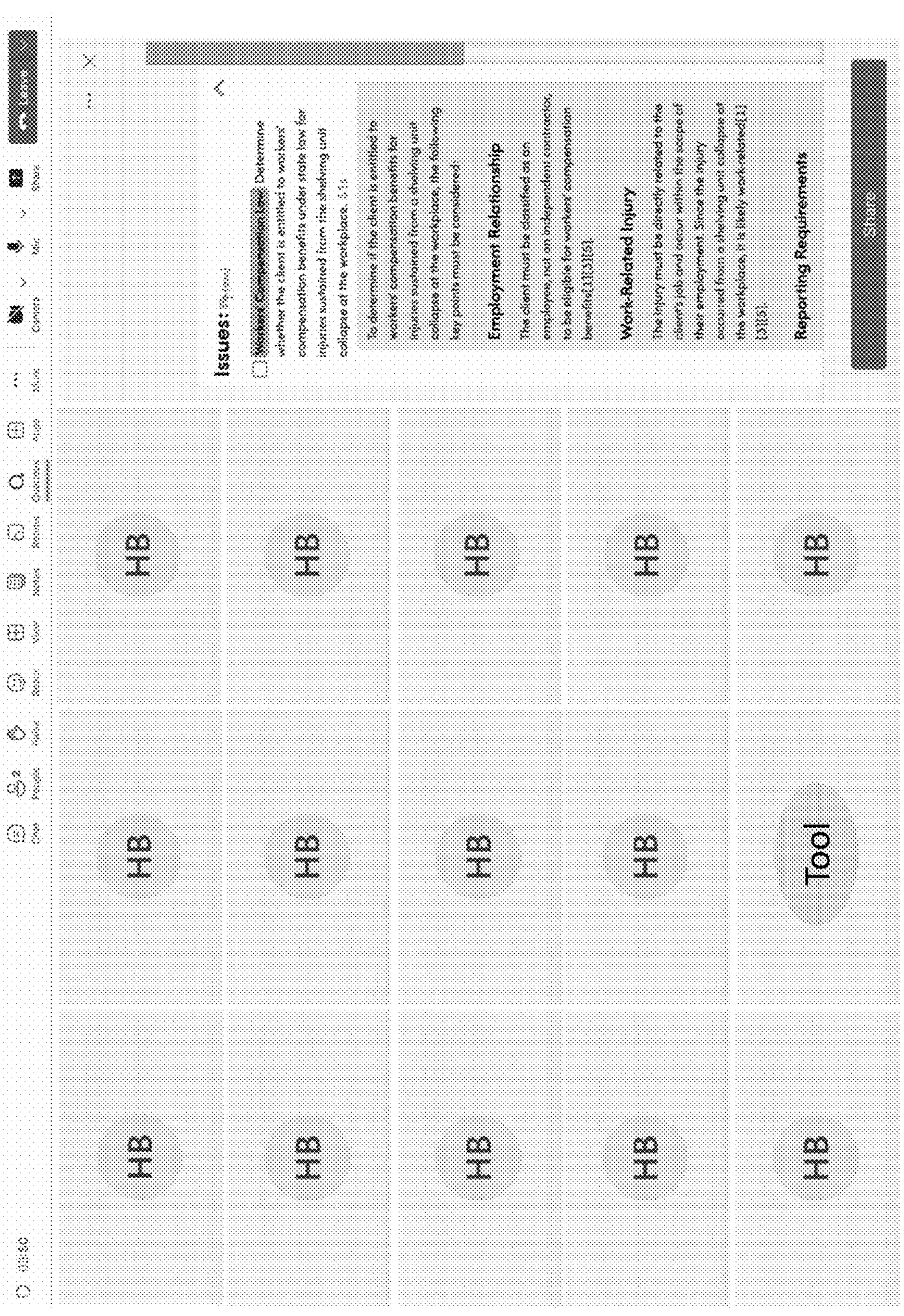
FIG. 2C illustrates a graphical user interface (GUI) during a meeting according to one embodiment of the present invention.

FIG. 2B illustrates a graphical user interface (GUI) during a meeting according to one embodiment of the present invention. In this embodiment, the tool is operable to attend the meeting as an individual attendee. In one embodiment, the tool is operable to generate at least one suggestion in a sidebar display of the video meeting interface. In another embodiment, the tool is operable to generate the at least one suggestion in a standalone browser. In the embodiment depicted in FIG. 2B, the at least one suggestion includes a legal issue (i.e., worker's compensation law) and/or at least one question relevant to the legal issue. The tool generates the at least one suggestion in real time and displays the at least one suggestion to at least one user account attending the meeting via the GUI. FIG. 2C illustrates a more detailed embodiment of the legal issue. In this embodiment, the tool generates relevant legal content related to the legal issue, such as elements of a claim, necessary facts to establish a legal claim, etc. Further, the tool uses citations (i.e., [1][3][5]) to reference legal content retrieved to generate the at least one suggestion. Although the legal content is not displayed in FIG. 2C, the tool is operable to link the legal content using the citations displayed in the sidebar.

Figure 2D:
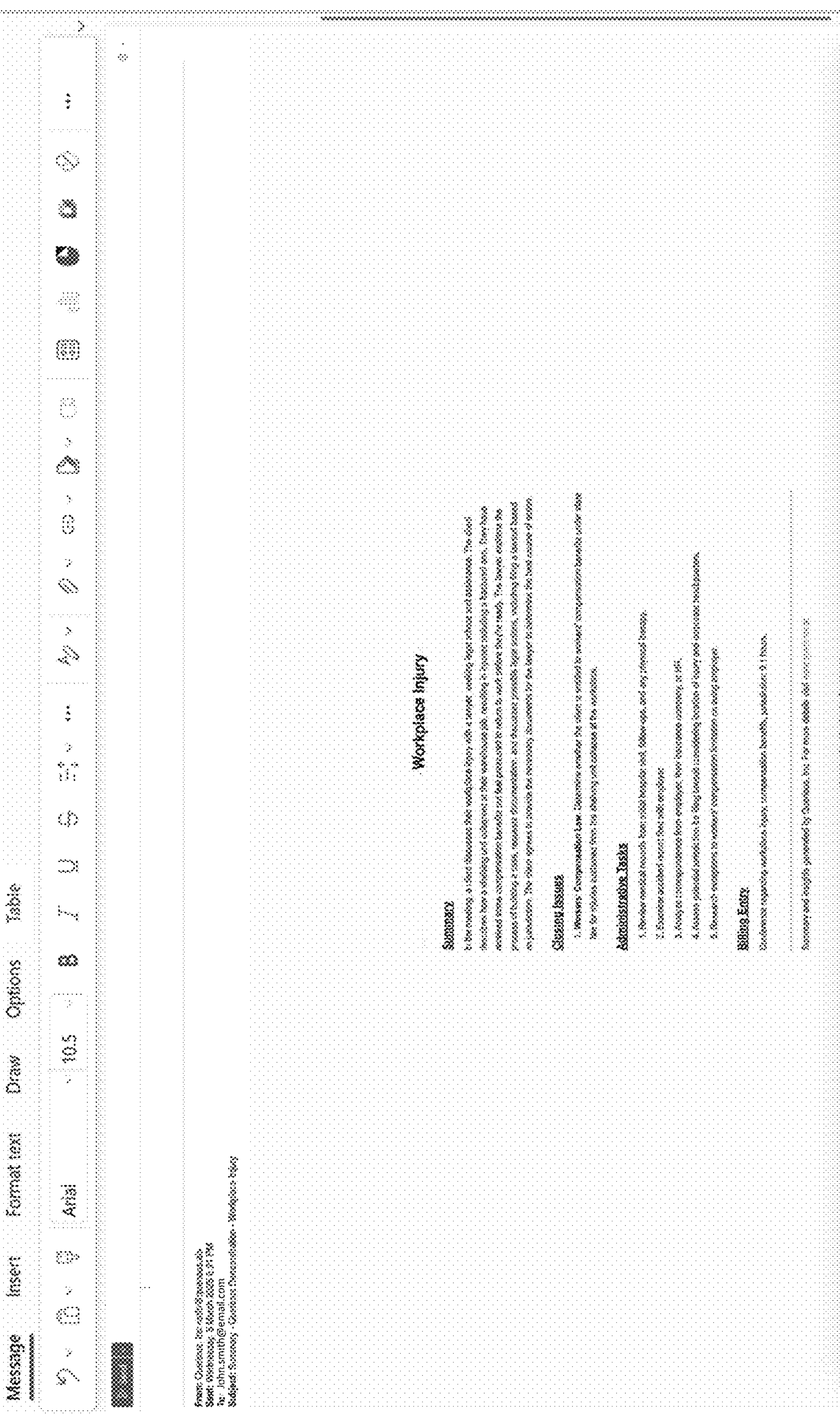
FIG. 2D illustrates a graphical user interface (GUI) after a meeting according to one embodiment of the present invention.

FIG. 2D illustrates a graphical user interface (GUI) after a meeting according to one embodiment of the present invention. In this embodiment, the tool is operable to generate and display a structured summary of the meeting, wherein the structured summary is organized based on topics discussed during the meeting. In this embodiment, the post-meeting GUI displays a summary of the meeting, closing issues, follow-up administrative tasks, and/or a billing entry, all of which the tool automatically generates.

In one embodiment, the tool is operable to generate a side panel or sidebar from the conversation window in which the tool is able to display the suggested issues, questions, and content relevant to the conversation. This allows the suggestions to be generated without direct insertion into the chat interface.

In one embodiment, the tool is operable to display a suggestion in a standalone browser window separate from a meeting interface before, during, and/or after a meeting. In one embodiment, the tool is operable to display the suggestion in a sidebar of a video meeting interface. In one embodiment, the tool is operable to display a suggestion within a meeting interface before, during, and/or after the meeting. In one embodiment, the tool is operable to information based on legal issues extracted from conversations during the meeting. In this embodiment, the information includes aggregated data from all or a subset of calls taking place over a period of time, which allows a user to identify trends in legal issues being identified. This information could be useful to users when making decisions about personnel, training, business risks and opportunities, and marketing activities. In this embodiment, the tool is operable to include a firm-wide dashboard for various members of the law firm to access the information.

Attorney-Client Matching

In one embodiment, the tool also includes matching functionality. The inclusion of profiles for clients and for attorneys, in particular, allows the platform to match attorneys with experience with a particular legal issue or legal subfield and having specific certifications or barred jurisdictions to clients based on NLP-based analysis of a description of the client matter. By way of example and not limitation, if the tool receives information that a particular client is struggling with drafting a will and the client is located in North Carolina, then the platform is operable to establish a communication link between the client and one or more attorneys barred in North Carolina (or firms having attorneys barred in North Carolina) that are experienced with drafting wills. In one embodiment, the matching functionality is operable to include knowledge from data within the tool and/or knowledge from the tool extracting information from publicly available sources.

Establishing which attorneys or firms are experienced with particular matters is able to be done by various means. In one embodiment, the tool tracks types of matters addressed by each attorney or firm with use of the tool over time, allowing the tool to have a proxy for experience with particular issues for each attorney or firm. In one embodiment, what jurisdictions the attorneys or firms operate in are also tracked over time, which is useful in instances where attorneys are barred in many different jurisdictions but potentially have the bulk of their experience and expertise in a particular jurisdiction. In another embodiment, the tool is operable to receive input, via an attorney device, of self-professed specialties or evidence of specialties (e.g., public cases in which an attorney was listed) to designate specialty fields for each attorney. This information is able to be used to match attorneys and clients. The level of specificity of experience that is matched varies, depending on an amount of data the platform has. For example, dealing with personal injury cases specifically resulting from slip and fall is able to be matched, or personal injury expertise in general is able to be matched.

Establishing a communication link between clients and attorneys is able to occur by different means. In one embodiment, contact information is transmitted (e.g., via an in-application interface, via email, via text, etc.) to the client for the recommended matched attorneys or firms. In another embodiment, the tool includes an integrated chat interface and automatically opens a chat between the matched client and attorney when the match occurs. In one embodiment, the tool includes integrated video meeting features where the tool is operable to initiate a meeting between an attorney and a client. In one embodiment, before matching the client with particular attorneys or firms, information regarding the matters, anonymized or not anonymized, is sent to the attorneys to be matched and approval from an attorney device is required before the communication link is able to be established. In one embodiment, when a communication link is established, a calendar item is automatically added for each of the attorney and client such that a subsequent audio or video call is scheduled to take place. In this embodiment, the tool is preferably integrated with at least one calendaring application for the client and/or the attorney to ensure that conflicts do not occur. In one embodiment, the tool is operable to automatically join a scheduled meeting by syncing to the calendaring application and joining the meeting at the scheduled start time.

The tool is also able to perform a number of additional tasks for ease of attorney time management. In one embodiment, the tool functions as an automatic time tracking, tracking when documents relating to a particular matter are opened or closed and calculating an amount of time worked on each matter to simplify billing. In one embodiment, the tool functions as an automatic time tracker by recording the length of time of a meeting and creating a short summary of the meeting (i.e., a billing entry). This information is able to be stored in the tool or sent to a third-party billing software to facilitate the billing process. The tool is further operable to automate billing after completion of specific matters and/or after specific pay periods (e.g., each month, each quarter, etc.). In one embodiment, the tool is able to automatically generate invoices and/or automatically send invoices to clients. In one embodiment, the tool is able to send and/or receive billing information to and/or from a third-party billing software to inform an attorney about collected invoices, client billing history, etc. so the attorney is able to converse with the client about matters relating to billing.

In one embodiment, the tool is operable to conduct and/or assist in conducting conflicts of interest checks for an attorney and/or a law firm. In one embodiment, the tool is operable to analyze client data and associated attorney data within a law firm and determine which, if any, attorneys are conflicted out for a particular client. In this embodiment, the tool is operable to route existing clients to non-conflicted attorneys within a law firm. In another embodiment, the tool is operable to route potential and/or existing clients to a compliance department for the compliance department to conduct conflicts checks.

The tool is operable to integrate with one or more other platforms used on an attorney device, including document management systems (e.g., NETDOCS, IMANAGE, etc.) and/or project management platforms (e.g., MONDAY, ASANA, JIRA, etc.). In one embodiment, the tool also includes a document drafting functionality. In one embodiment, the tool integrates with at least one document drafting tool. In one embodiment, intended as a nonlimiting example, the tool is operable to draft Non-Disclosure Agreements (NDAs), business proposals, engagement letters, contracts, court briefs, and/or any other legal document based in part on context extracted from conversations between meeting attendees. Further, in one embodiment, the tool is operable to accumulate information for a client based on a plurality of meeting summaries and draft at least one legal document based on the accumulated information for the client.

Importantly, the platform is operable for use in a plurality of industries. The platform is operable to enhance live conversations by spotting relevant issues for a particular industry and use the spotted issues to drive follow-up questions and/or summaries. To do so, the platform is operable to receive instructions tuning at least one AI engine to focus on a specific industrial sector. For example, the platform is operable to receive instructions that the platform is joining a meeting between a doctor and a patient and must provide medical diagnosis based on the meeting and generate follow-up questions to help the doctor better diagnose the patient. Further, instead of identifying a legal issue and/or assisting attorney billing, the platform is operable to identify a medical condition and generate a billing code used by the doctor.

In one embodiment, the platform is operable for use in accounting. In this embodiment, the platform is operable to be used during meetings between accountants and clients. In one embodiment, the platform is operable to integrate into telephone meetings, web meeting, and/or in-person meetings. The platform is operable to utilize ML, AI, NNs, deep learning, historical data, and/or data mining to provide real-time insights on tax regulations, financial reporting standards, and/or accounting best practices. In one embodiment, the accounting best practices are determined by a national accounting standard. In one embodiment, the accounting best practices are determined by best practices of an individual accounting firm. The platform is operable to suggest relevant questions for the accountant to ask the client about financial transactions, flag potential audit issues, and assist in generating accurate financial statements. After a meeting between at least one accountant and at least one client, the platform is operable to draft detailed notes on topics discussed during the meeting and create at least one task list for follow-up actions. For example, the platform is operable to create a task for the at least one accountant to prepare tax documents or update financial records of the at least one client.

In one embodiment, the platform is operable for use in finance. In this embodiment, the platform is operable to assist a financial advisor during a client consultation. The platform is operable to utilize ML, AI, NNs, deep learning, historical data, and/or data mining to provide real-time market insights, investment strategies, and/or risk investment assessments. The platform is operable to analyze a client's financial portfolio before, during, and/or after a consultation/meeting and suggest personalized investment opportunities and provide explanations of complex financial products. The platform is also operable to help financial advisors by generating financial plans and/or meeting reports based on topics discussed in client meeting.

In one embodiment, the platform is operable for use in human resource departments. In this embodiment, the platform is operable to assist a human resource professional by attending interviews and performance review meetings. The platform is operable to utilize ML, AI, NNs, deep learning, historical data, and/or data mining to suggest relevant questions for the human resources professional based on a job description and/or employee performance data. The platform is further operable to provide real-time insights on company policies, labor laws, and/or identify potential areas for employee development and improvement. The platform is also operable to generate summaries of interviews and/or review meetings, create personalized employee development plans, and/or automatically update employee records.

In one embodiment, the platform is operable for use in journalism. In this embodiment, the platform is operable to suggest follow-up questions based on an interviewee's response to an interviewer's question. Further, the platform is operable to provide real-time fact checking. The platform is operable to identity potential story angles and determine relevant background information during the interview process. Post interview, the platform is operable to generate draft news articles, draft blog posts, summarize key interview points, and/or suggest additional sources to the journalist for further investigation.

In one embodiment, the platform is operable for use in medicine. In this embodiment, the platform is operable to join virtual, in-person, and/or telephonic consultations between doctors and patients. The platform is operable to provide real-time information on patient symptoms, treatment options, and/or drug interactions based on the patient's medical history and/or topics discussed during the consultation. The platform is further operable to suggest relevant questions for the doctor to ask the patient. After a consultation, the platform is operable to generate detailed medical notes, create treatment plans, and/or schedule follow-up appointments.

In one embodiment, the platform is operable for use in real estate. In this embodiment, the platform is operable to join virtual, telephonic, and/or in-person meetings between real estate agents/brokers and clients. The platform is operable to provide real-time property information including price, property tax value, property boundaries, and/or any other relevant property information. The platform is further operable to provide real-time analysis of market trends and conduct comparative analysis of other properties. The platform is operable to suggest relevant questions for the real estate agent to ask the client about client preferences, offer virtual property tours, and/or provide insights on property values and/or investment potential. After the meeting, the platform is operable to generate personal property recommendations, create detailed meeting summaries, and/or automate follow-up tasks such as scheduling property viewings.

In one embodiment, the platform is operable for use in insurance. In this embodiment, the platform is operable to join virtual, telephonic, and/or in-person meetings between insurance professionals and clients. The platform is operable to suggest personalized coverage based on a client profile and/or topics discussed in the meeting. After the meeting, the platform is operable to generate an insurance policy summary, automatically being the underwriting process, create a task list for policy insurance, and/or create follow-up tasks.

In one embodiment, the platform is operable for use in management consulting. In this embodiment, the platform is operable to join virtual, telephonic, and/or in-person meetings between consultants and clients. The platform is operable to provide real-time insights on industry trends, market data, and/or best practices. The platform is further operable to provide real-time information on emerging technologies, market demand, and/or competitor analysis. During a meeting, the platform is operable to suggest relevant questions about business strategies, operational efficiency, technical specifications, user experience design, scalability concerns, and/or competitive analysis. After the meeting, the platform is operable to generate comprehensive reports on topics discussed during the meeting, create action plans for implementation of certain strategies discussed during the meeting, draft technical documentation, generate project proposals, and/or draft proposals for clients.

In one embodiment, the platform is operable for use in therapy. In this embodiment, the platform is operable to join virtual, telephonic, and/or in-person meetings between a therapist and a client. The platform is operable to provide real-time information on treatment approaches, relevant research, and/or patient history. During therapy sessions, the platform is operable to suggest questions for the therapist to ask the client to help explore the patient's concerns more deeply and offer insights on potential therapeutic strategies. After a therapy session, the platform is operable to generate detailed session notes, create personalize treatment plans, and/or track patient progress over time.

In one embodiment, the platform is operable for use in manufacturing. In this embodiment, the platform is operable to join virtual, telephonic, and/or in-person meetings between managers, engineers, and/or suppliers. The platform is operable to provide real-time insights on production processes, supply chain optimization, and/or quality control measures. During the meeting, the platform is operable to suggest relevant questions about production efficiency, equipment maintenance, and/or inventory management. After the meeting, the platform is operable to generate detailed summaries of production plans, creates task lists for process improvements, and/or draft reports on manufacturing performance metrics.

In one embodiment, the platform is operable for use in education. In this embodiment, the platform is operable to join virtual, telephonic, and/or in-person classrooms and/or faculty meetings. During classes, the platform is operable to provide real-time information on curriculum standards, suggest engaging teaching methods, and/or offer insights on student performance trends. During faculty meetings, the platform is operable to generate ideas for curriculum development, suggest strategies for improving student engagement, and/or provide data-driven insights on educational outcomes. Additionally, the platform is operable to assist academic counselors by providing guidance to students about what courses to takes or what college and/or programs to apply to. After classes and/or faculty meetings, the platform is operable to create detailed lesson plans, generate progress reports for students, and/or automate administrative tasks like scheduling and/or grading.

In one embodiment, the platform is operable for use in retail. In this embodiment, the platform is operable to join virtual, telephonic, and/or in-person meetings between store managers, buyers, and/or suppliers. The platform is operable to provide real-time market trends, analyze current market trends, suggest inventory optimization strategies, and/or generate consumer behavior insights. During the meeting, the platform is operable to suggest questions about product performance, pricing strategies, and/or customer feedback. After the meeting, the platform is operable to generate detailed merchandise plans, create a task list for inventory management, and/or draft reports on sales performance and/or customer satisfaction metrics.

In one embodiment, the platform is operable for use in environmental services. In this embodiment, the platform is operable to join virtual, telephonic, and/or in-person meetings between environmental consultants, policymakers, and/or corporate clients. The platform is operable to provide real-time data on environmental regulations, sustainability practices, and/or impact assessments. During the meeting, the platform is operable to suggest questions about carbon footprint reduction, waste management strategies, and/or renewable energy implementation. After the meeting, the platform is operable to generate comprehensive environmental reports, create action plans for sustainability initiatives, and/or draft proposals for green projects.

In one embodiment, the platform is operable for use in the Department of Defense (DoD). In this embodiment, the platform is operable to join virtual, telephonic, and/or in-person interview between members of the DoD. During the meeting, the platform is operable to provide real-time insights on threat assessment, suggest relevant questions for intelligence briefings, procurement processes and guidelines, asset classification and location, rules and regulations, and/or offer data driven recommendations for strategic decisions. After the meeting, the platform is operable to generate detailed summaries of operation plans, create tasks lists for different military units, and/or draft reports on mission readiness and/or resource allocation. Further, the platform is operable to assist the DoD in procurement, asset management, and/or personnel management.

In one embodiment, the platform is operable for use in federal agencies. In this embodiment, the platform is operable to join virtual, telephonic, and/or in-person meetings between policymakers, agency leaders, and/or stakeholders. The platform is operable to provide real-time information on legislative updates, policy impacts, and/or cross-agency data. During the meeting, the platform is operable to suggest questions about program effectiveness, budget allocations, and/or regulatory compliance. After the meeting, the platform is operable to generate comprehensive policy briefs, create action plans for inter-agency collaboration, and/or draft reports on government initiatives and the possible outcomes.

In one embodiment, the platform is operable for use in state agencies and/or departments. In this embodiment, the platform is operable to join virtual, telephonic, and/or in-person meetings between state officials, department heads, and/or local representatives. The platform is operable to provide real-time data on state-wide trends, budget forecasts, and/or program performance metrics. During the meeting, the platform is operable to suggest questions about resource allocation, public health initiatives, and/or infrastructure projects. After the meeting, the platform is operable to generate detailed implementation plans for state policies, create task lists for different state departments, and/or draft reports on state-wide initiatives and the impact on citizens.

In one embodiment, the platform is operable for use in local governments. In this embodiment, the platform is operable to join virtual, telephonic, and/or in-person meetings between city officials, community leaders, and/or service providers. The platform is operable to offer real-time insights on local demographics, budget constraints, and/or community needs. During the meeting, the platform is operable to suggest questions about urban planning, public services, and/or community engagement initiatives. After the meeting, the platform is operable to generate action plans for local projects, create task lists for different municipal departments, and/or draft reports on city initiatives and the impact on residents.

In one embodiment, the platform is operable for use by travel agents. In this embodiment, the platform is operable to facilitate virtual, telephonic, and/or in-person consultations between travel agents, clients, and/or travel service providers. The platform is operable to offer real-time insights on travel trends, budget constraints, and/or client preferences. During the consultation, the platform is operable to suggest questions about travel itineraries, accommodation options, and/or cultural nuances of a particular destination. After the consultation, the platform is operable to generate a list of available flights and hotels and/or create a task list for the travel agent.

Figure 3:
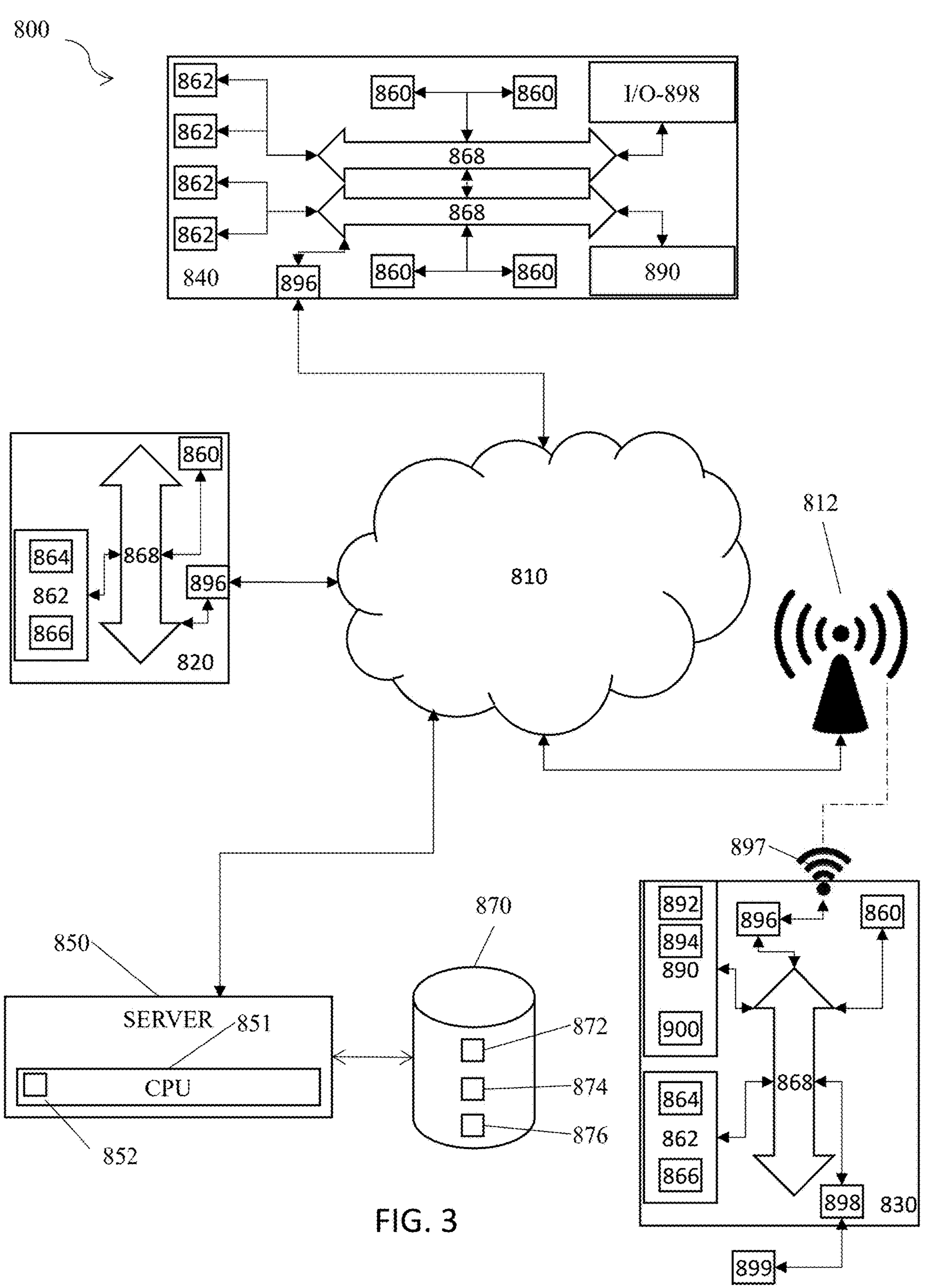
FIG. 3 is a schematic diagram of a system of the present invention.

FIG. 3 is a schematic diagram of an embodiment of the invention illustrating a computer system, generally described as 800, having a network 810, a plurality of computing devices 820, 830, 840, a server 850, and a database 870.

The server 850 is constructed, configured, and coupled to enable communication over a network 810 with a plurality of computing devices 820, 830, 840. The server 850 includes a processing unit 851 with an operating system 852. The operating system 852 enables the server 850 to communicate through network 810 with the remote, distributed user devices. Database 870 is operable to house an operating system 872, memory 874, and programs 876.

In one embodiment of the invention, the system 800 includes a network 810 for distributed communication via a wireless communication antenna 812 and processing by at least one mobile communication computing device 830. Alternatively, wireless and wired communication and connectivity between devices and components described herein include wireless network communication such as WI-FI, WORLDWIDE INTEROPERABILITY FOR MICROWAVE ACCESS (WIMAX), Radio Frequency (RF) communication including RF identification (RFID), NEAR FIELD COMMUNICATION (NFC), BLUETOOTH including BLUETOOTH LOW ENERGY (BLE), ZIGBEE, Infrared (IR) communication, cellular communication, satellite communication, Universal Serial Bus (USB), Ethernet communications, communication via fiber-optic cables, coaxial cables, twisted pair cables, and/or any other type of wireless or wired communication. In another embodiment of the invention, the system 800 is a virtualized computing system capable of executing any or all aspects of software and/or application components presented herein on the computing devices 820, 830, 840. In certain aspects, the computer system 800 is operable to be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of electronic devices including at least a processor and a memory, such as a server, blade server, mainframe, mobile phone, personal digital assistant (PDA), smartphone, desktop computer, netbook computer, tablet computer, workstation, laptop, and other similar computing devices. The components shown here, their connections and relationships, and their functions, are meant to be exemplary only, and are not meant to limit implementations of the invention described and/or claimed in the present application.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 is operable to additionally include components such as a storage device 890 for storing the operating system 892 and one or more application programs 894, a network interface unit 896, and/or an input/output controller 898. Each of the components is operable to be coupled to each other through at least one bus 868. The input/output controller 898 is operable to receive and process input from, or provide output to, a number of other devices 899, including, but not limited to, alphanumeric input devices, mice, electronic styluses, display units, touch screens, gaming controllers, joy sticks, touchpads, signal generation devices (e.g., speakers), augmented reality/virtual reality (AR/VR) devices (e.g., AR/VR headsets), or printers.

By way of example, and not limitation, the processor 860 is operable to be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown as 840 in FIG. 3, multiple processors 860 and/or multiple buses 868 are operable to be used, as appropriate, along with multiple memories 862 of multiple types (e.g., a combination of a DSP and a microprocessor, a plurality of microprocessors, one or more microprocessors in conjunction with a DSP core).

Also, multiple computing devices are operable to be connected, with each device providing portions of the necessary operations (e.g., a server bank, a group of blade servers, or a multi-processor system). Alternatively, some steps or methods are operable to be performed by circuitry that is specific to a given function.

According to various embodiments, the computer system 800 is operable to operate in a networked environment using logical connections to local and/or remote computing devices 820, 830, 840 through a network 810. A computing device 830 is operable to connect to a network 810 through a network interface unit 896 connected to a bus 868. Computing devices are operable to communicate communication media through wired networks, direct-wired connections or wirelessly, such as acoustic, RF, or infrared, through an antenna 897 in communication with the network antenna 812 and the network interface unit 896, which are operable to include digital signal processing circuitry when necessary. The network interface unit 896 is operable to provide for communications under various modes or protocols.

In one or more exemplary aspects, the instructions are operable to be implemented in hardware, software, firmware, or any combinations thereof. A computer readable medium is operable to provide volatile or non-volatile storage for one or more sets of instructions, such as operating systems, data structures, program modules, applications, or other data embodying any one or more of the methodologies or functions described herein. The computer readable medium is operable to include the memory 862, the processor 860, and/or the storage media 890 and is operable be a single medium or multiple media (e.g., a centralized or distributed computer system) that store the one or more sets of instructions 900. Non-transitory computer readable media includes all computer readable media, with the sole exception being a transitory, propagating signal per se. The instructions 900 are further operable to be transmitted or received over the network 810 via the network interface unit 896 as communication media, which is operable to include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 include, but are not limited to, volatile and non-volatile media such as cache, RAM, ROM, EPROM, EEPROM, FLASH memory, or other solid state memory technology; discs (e.g., digital versatile discs (DVD), HD-DVD, BLU-RAY, compact disc (CD), or CD-ROM) or other optical storage; magnetic cassettes, magnetic tape, magnetic disk storage, floppy disks, or other magnetic storage devices; or any other medium that can be used to store the computer readable instructions and which can be accessed by the computer system 800.

In one embodiment, the computer system 800 is within a cloud-based network. In one embodiment, the server 850 is a designated physical server for distributed computing devices 820, 830, and 840. In one embodiment, the server 850 is a cloud-based server platform. In one embodiment, the cloud-based server platform hosts serverless functions for distributed computing devices 820, 830, and 840.

In another embodiment, the computer system 800 is within an edge computing network. The server 850 is an edge server, and the database 870 is an edge database. The edge server 850 and the edge database 870 are part of an edge computing platform. In one embodiment, the edge server 850 and the edge database 870 are designated to distributed computing devices 820, 830, and 840. In one embodiment, the edge server 850 and the edge database 870 are not designated for distributed computing devices 820, 830, and 840. The distributed computing devices 820, 830, and 840 connect to an edge server in the edge computing network based on proximity, availability, latency, bandwidth, and/or other factors.

It is also contemplated that the computer system 800 is operable to not include all of the components shown in FIG. 3, is operable to include other components that are not explicitly shown in FIG. 3, or is operable to utilize an architecture completely different than that shown in FIG. 3. The various illustrative logical blocks, modules, elements, circuits, and algorithms described in connection with the embodiments disclosed herein are operable to be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. An artificial intelligence (AI)-based system for automatically suggesting potential legal issues, comprising:

at least one computer processor including a memory;

at least one AI engine; and at least one user account;

wherein the at least one user account hosts and/or attends at least one virtual meeting;

wherein the at least one AI engine is integrated into a video chat interface;

wherein the at least one computer processor is operable to receive at least one input from the at least one user account;

wherein the at least one input includes a live conversation;

wherein the at least one input is not uploaded information;

wherein the at least one AI engine is operable to automatically determine and display at least one tailored recommendation, in real-time, during the at least one virtual meeting based on the at least one input;

wherein the at least one AI engine is operable to generate a standalone browser window separate from the video chat interface;

wherein the standalone browser window and the video chat interface are displayed via a graphical user interface (GUI);

wherein the at least one AI engine utilizes at least one application programming interface (API) to automatically resize and/or reorganize icons on the video chat interface after generating the standalone browser window such that the video chat interface and the standalone browser window are simultaneously displayed via the GUI;

wherein the at least one tailored recommendation includes at least one question, at least one legal issue automatically identified by the at least one AI engine, relevant legal content relating to the at least one legal issue, and at least one collaborator;

wherein the at least one AI engine generates and formats the at least one tailored recommendation based on a legal practice area, professional licensure, and professional experiences associated with the at least one user account;

wherein the at least one AI engine is operable to communicate with an external legal practice management program; and wherein the at least one AI engine is operable to populate the standalone browser window with the at least one tailored recommendation based on the at least one input to display to the at least one user account.

2. The system of claim 1, wherein the at least one AI engine is operable to utilize natural language processing to process the at least one input, and wherein the at least one input includes audio transcripts, live audio data, text, and/or at least one document.

3. The system of claim 1, wherein the at least one AI engine is operable to determine a relevant jurisdiction for the at least one legal question based in part on geolocation, input received from the plurality of user accounts, at least one administrative account, and/or natural language processing (NLP).

4. The system of claim 1, wherein the at least one AI engine is operable to generate at least one structured summary organized by topic based on context from the at least one virtual meeting.

5. The system of claim 4, wherein the at least one AI engine is operable to generate additional structured summaries for subsequent meetings, and wherein the at least one AI engine is operable to aggregate and summarize a combination of the at least one structured summary and the additional structured summaries.

6. The system of claim 1, wherein the at least one AI engine is operable to determine the at least one tailored recommendation by ingesting and training from scraped web data, utilizing a search engine, and/or searching at least one database and outputting the at least one tailored recommendation as a natural language output via a large language model.

7. The system of claim 1, wherein the AI-based system is operable to integrate with at least one video conferencing platform.

8. An artificial intelligence (AI)-based system for automatically suggesting potential legal issues, comprising:

at least one computer processor including a memory;

at least one AI engine including a large language model; and at least one user account;

wherein the at least one user account hosts and/or attends at least one virtual meeting;

wherein the at least one AI engine is integrated into a scheduling platform via at least one application programming interface (API);

wherein the at least one AI engine creates pre-meeting context for the at least one virtual meeting before the at least one virtual meeting based in part on data extracted from the scheduling platform;

wherein the at least one computer processor is operable to receive at least one input from the at least one user account;

wherein the at least one input includes a live conversation;

wherein the at least one input is not uploaded information;

wherein the at least one AI engine creates in-meeting context for the at least one virtual meeting in real-time based on the at least one input;

wherein the at least one AI engine is operable to utilize natural language processing to analyze the at least one input;

wherein the at least one AI engine is operable to automatically determine and display at least one suggestion, in real-time, during the at least one virtual meeting based on the at least one input;

wherein the at least one AI engine utilizes the in-meeting context to fine tune, in real-time, the at least one suggestion to increase relevancy of the at least one suggestion to the at least one user account;

wherein the at least one suggestion includes at least one question, at least one legal issue automatically identified by the at least one AI engine, relevant legal content relating to the at least one legal issue, and at least one collaborator;

wherein the at least one AI engine is operable to automatically designate, during the at least one virtual meeting, the at least one collaborator for the at least one legal issue based on a legal practice area, professional licensure, and professional experiences of the at least one collaborator; and wherein the at least one suggestion is displayed to the at least one user account as a natural language output via the large language model.

9. The system of claim 8, wherein the at least one AI engine is operable to generate at least one structured summary organized by topic based on context from the at least one virtual meeting.

10. The system of claim 8, wherein the at least one AI engine is operable to determine the at least one legal issue by querying at least one legal database, scraping data from at least one publicly available internet source, conducting a semantic analysis of the at least one input, and/or by the at least one AI engine analyzing at least one document.

11. The system of claim 8, wherein the AI-based system is operable to integrate with at least one video conferencing platform.

12. The system of claim 8, wherein the at least one collaborator includes a qualified professional based on the at least one legal issue.

13. The system of claim 8, wherein the at least one question includes a solicitation for more information about the at least one legal issue.

14. The system of claim 8, wherein the at least one AI engine is operable to determine a relevant jurisdiction based in part on geolocation, input received from the plurality of user accounts, a document, and/or natural language processing (NLP).

15. The system of claim 8, wherein the at least one input is operable to include text, audio, video, and/or at least one document.

16. The system of claim 8, wherein the relevant legal content includes information from relevant statutes, regulations, laws, and/or any other relevant legal source, and wherein the at least one AI engine includes citations to the relevant legal content within the at least one suggestion.

17. An artificial intelligence (AI)-based system for automatically suggesting potential legal issues, comprising:

at least one computer processor including a memory;

at least one AI engine; and at least one user account;

wherein the at least one user account hosts and/or attends at least one virtual meeting;

wherein the at least one AI engine is integrated into a video chat interface;

wherein the at least one AI engine is integrated into a scheduling platform via a first set of at least one application programming interface (API);

wherein the at least one AI engine creates pre-meeting context for the at least one virtual meeting before the at least one virtual meeting based in part on data extracted from the scheduling platform, the pre-meeting context being used to fine tune reasoning ability of the at least one AI engine prior to the at least one virtual meeting;

wherein the at least one computer processor is operable to receive at least one input from the at least one user account;

wherein the at least one input includes a live conversation;

wherein the at least one input is not uploaded information;

wherein the at least one AI engine creates in-meeting context for the at least one virtual meeting in real-time based on the at least one input;

wherein the at least one AI engine is operable to automatically determine and display at least one suggestion, in real-time, during the at least one virtual meeting based on the at least one input;

wherein the at least one AI engine is operable to adaptively adjust data sources used to determine the at least one suggestion based on a legal practice area associated with the at least one user account and topics discussed during the at least one virtual meeting;

wherein the at least one AI engine utilizes the in-meeting context to fine tune, in real-time, the at least one suggestion to increase relevancy of the at least one suggestion to the at least one user account;

wherein the at least one suggestion includes at least one question, at least one legal issue automatically identified by the at least one AI engine, relevant legal content relating to the at least one legal issue, and at least one collaborator;

wherein the at least one AI engine is operable to generate a standalone browser window separate from the video chat interface and/or generate a chat browser integrated into the video chat interface;

wherein the standalone browser window and/or the chat browser and the video chat interface are displayed via a graphical user interface (GUI);

wherein the at least one AI engine utilizes a second set of at least one API to automatically resize and/or reorganize icons on the video chat interface after generating the standalone browser window and/or the chat browser such that the video chat interface and the standalone browser window and/or the chat browser are simultaneously displayed via the GUI;

wherein the at least one AI engine is operable to populate the standalone browser window and/or the chat browser with the at least one suggestion based on the at least one input to display to the at least one user account;

wherein the at least one AI engine is operable to communicate with an external legal practice management program;

wherein the at least one AI engine is operable to tailor the at least one suggestion such that the at least one suggestion is operable to be different for the at least one user account attending the at least one virtual meeting from a second user account attending the at least one virtual meeting based on a legal practice area, professional licensure, and professional experiences of the at least one user account and the second user account;

wherein the at least one AI engine is operable to generate a structured billable time entry for the at least one virtual meeting organized by the topics discussed in the at least one virtual meeting; and wherein the structured billable time entry includes the at least one AI engine mapping the structured billable time entry to a client number identified by the at least one AI engine via the pre-meeting context and formatting the structured billable time entry according to client settings the at least one AI engine identifies via the external practice management program.

18. The system of claim 17, wherein the at least one AI engine is operable to generate additional structured billable time entries for subsequent meetings, and wherein the at least one AI engine is operable to aggregate and summarize a combination of the structured billable time entries and the additional structured billable time entries to use as an overall bill.

19. The system of claim 17, wherein the at least one AI engine is operable to use a structured summary, additional structured summaries, and/or a combination of the structured summary and the additional structured summaries to recommend at least one professional.

20. The system of claim 17, wherein the at least one AI engine is operable to modify the structured billable time entry based in part on information saved in the memory for a particular client.

* * * * *